US012000449B2

United States Patent
Bonessio

(10) Patent No.: US 12,000,449 B2
(45) Date of Patent: Jun. 4, 2024

(54) TRI-ADAPTIVE APPARATUS FOR SHOCK AND VIBRATION PROTECTION

(71) Applicant: METAseismic, Inc., Berkeley, CA (US)

(72) Inventor: Noemi Bonessio, Berkeley, CA (US)

(73) Assignee: METAseismic, Inc., Berkeley, CA (US)

( * ) Notice: Subject to any disclaimer, the term of this patent is extended or adjusted under 35 U.S.C. 154(b) by 0 days.

(21) Appl. No.: 18/206,758

(22) Filed: Jun. 7, 2023

(65) Prior Publication Data

US 2023/0392668 A1 Dec. 7, 2023

Related U.S. Application Data

(60) Provisional application No. 63/349,868, filed on Jun. 7, 2022.

(51) Int. Cl.
*F16F 13/04* (2006.01)
(52) U.S. Cl.
CPC ........ *F16F 13/04* (2013.01); *F16F 2228/066* (2013.01)
(58) Field of Classification Search
CPC .......... F16F 13/08; F16F 13/10; F16F 13/108; F16F 13/16; F16F 15/022; F16F 15/08; F16F 13/101; F16F 13/268; F16F 15/02; F16F 7/00; F16F 2230/007; F16F 13/00; F16F 13/22; F16F 1/373; F16F 13/1409; F16F 13/085; F16F 15/002; F16F 1/422;
(Continued)

(56) References Cited

U.S. PATENT DOCUMENTS 3,921,240 A   11/1975   Fyfe
4,269,011 A    5/1981   Ikonomou
(Continued)

FOREIGN PATENT DOCUMENTS

CN   110616811 A    12/2019
CN   115190934 A  * 10/2022
(Continued)

OTHER PUBLICATIONS

International Search Report and Written Opinion for PCT/US2023/024667, dated Sep. 7, 2023.

*Primary Examiner* — Robert A. Siconolfi
*Assistant Examiner* — Mahbubur Rashid
(74) *Attorney, Agent, or Firm* — Master Key IP, LLP; Justin G. Sanders

(57) ABSTRACT

A tri-adaptive apparatus is disclosed and configured for functioning as a dynamic force isolation and dampening metamaterial that reduces the transmission of dynamic forces between a dynamic force source and an object. In at least one embodiment, the apparatus provides at least one cell unit that provides a pair of opposing first and second cell plates, between which is positioned at least one spring, restrainer and dashpot. An outer surface of the first cell plate is positioned in contact with the dynamic force source. An outer surface of the second cell plate is positioned in contact with the object. The at least one spring, restrainer and dashpot are configured for transferring dynamic force energy mutually between one another while deforming mechanically in response to the dynamic forces transmitted by the dynamic force source.

13 Claims, 14 Drawing Sheets

(58) Field of Classification Search
CPC ........ F16F 2230/02; F16F 9/006; F16F 13/04; F16F 2228/066
See application file for complete search history.

(56) References Cited

U.S. PATENT DOCUMENTS

| | | | |
|---|---|---|---|
| 4,371,141 | A | 2/1983 | Baratoff |
| 4,555,098 | A * | 11/1985 | Shtarkman .............. F16F 13/20 |
| | | | 267/141.6 |
| 4,564,219 | A | 1/1986 | Baden et al. |
| 5,302,016 | A | 4/1994 | Lautenschlaeger et al. |
| 6,052,955 | A | 4/2000 | Haider |
| 6,402,219 | B1 * | 6/2002 | Hopf ..................... F16F 15/085 |
| | | | 296/70 |
| 8,246,023 | B2 * | 8/2012 | Cappeller .............. F16F 3/023 |
| | | | 267/102 |
| 8,317,025 | B1 | 11/2012 | Kolozs et al. |
| 8,777,191 | B2 * | 7/2014 | Kligerman ........... F16F 3/0876 |
| | | | 267/152 |
| 10,174,467 | B1 | 1/2019 | Li et al. |
| 11,300,176 | B2 | 4/2022 | Bonessio |
| 2008/0023896 | A1 * | 1/2008 | Brewster .............. F04D 29/668 |
| | | | 267/140.11 |
| 2008/0023899 | A1 * | 1/2008 | Hasegawa .............. F16F 7/108 |
| | | | 267/141.1 |
| 2014/0183801 | A1 * | 7/2014 | Lee ....................... F16F 13/08 |
| | | | 267/140.11 |
| 2014/0306576 | A1 * | 10/2014 | Ervin ..................... B64C 23/06 |
| | | | 267/136 |
| 2015/0076315 | A1 | 3/2015 | Tu et al. |
| 2016/0298300 | A1 | 10/2016 | Li et al. |
| 2017/0044763 | A1 | 2/2017 | Shu |
| 2018/0334825 | A1 | 11/2018 | Bonessio et al. |
| 2021/0156443 | A1 * | 5/2021 | Muha ..................... F16F 1/373 |
| 2022/0299083 | A1 * | 9/2022 | Gilmore ................ F16F 3/026 |
| 2022/0373055 | A1 * | 11/2022 | Ueno .................... F16F 15/022 |

FOREIGN PATENT DOCUMENTS

| | | |
|---|---|---|
| DE | 102014004059 A1 * | 9/2015 |
| DE | 202016102111 U1 * | 5/2016 |
| JP | 04203629 A * | 7/1992 |
| JP | 2022517408 A * | 3/2022 |
| WO | WO 2008127731 A1 * | 10/2008 |
| WO | 2016201109 A1 | 12/2016 |
| WO | 2018131757 A1 | 7/2018 |

* cited by examiner

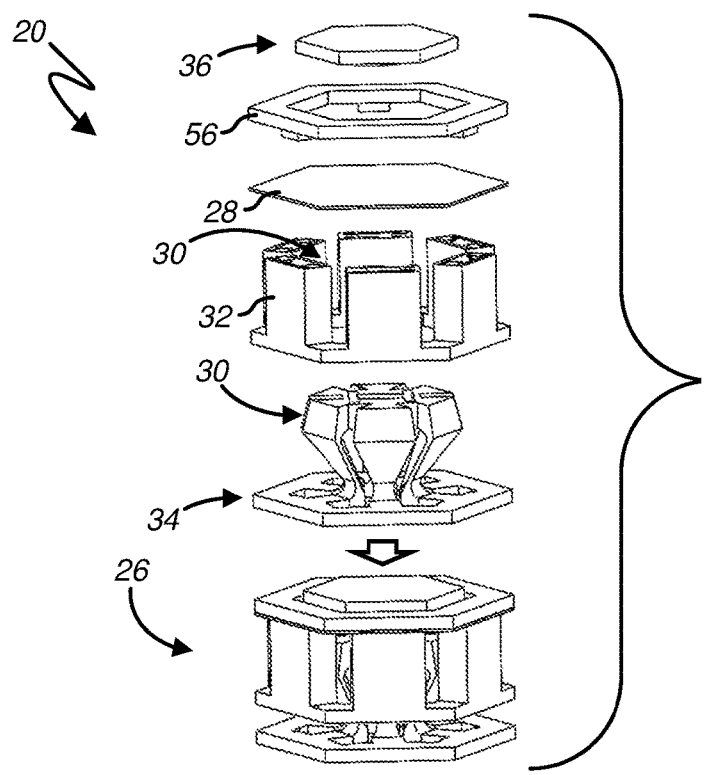
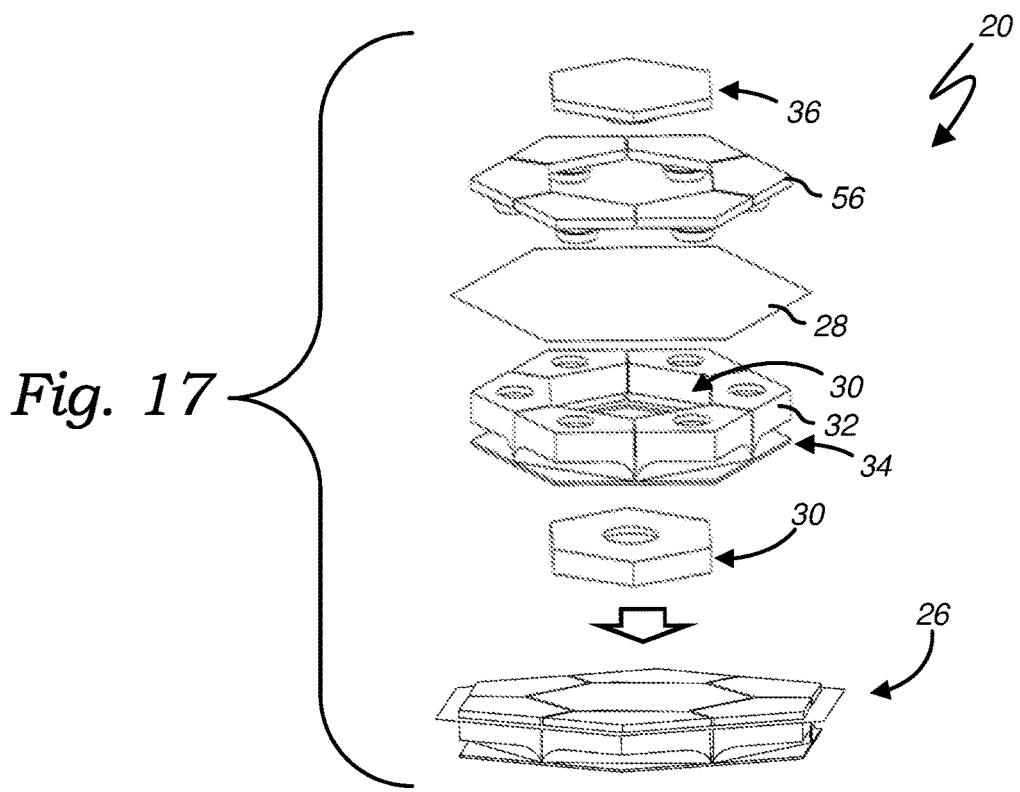

TRI-ADAPTIVE APPARATUS FOR SHOCK AND VIBRATION PROTECTION

RELATED APPLICATIONS

This application claims priority and is entitled to the filing date of U.S. provisional application Ser. No. 63/349,868, filed on Jun. 7, 2022. The contents of the aforementioned application are incorporated herein by reference.

GOVERNMENT LICENSE RIGHTS

This invention was made with U.S. government support under Grant No. 1927071, awarded by the National Science Foundation (NSF). The U.S. government has certain rights in this invention.

BACKGROUND

The subject of this patent application relates generally to systems and methods for providing shock and vibration protection, and more particularly to a tri-adaptive apparatus configured for providing shock and vibration protection in shipping, transportation, work, sports, buildings and natural environments.

Applicant hereby incorporates herein by reference any and all patents and published patent applications cited or referred to in this application.

By way of background, shock and vibration suppression in vehicles and buildings, due to the effects of vibrating machinery and dynamic loads, usually requires protective materials and designs that add costs and weight. Shock and vibration suppression is also needed for other types of objects, now known or later developed, including but in no way limited to cargo, satellites, batteries, IT equipment, electronic equipment, avionics equipment, buildings, etc., as well as for people participating in impact sports, operating vibrating tools, etc. Some known prior art shock and vibration control systems reduce vibration by adding hardening structures and reinforcements. Other known prior art systems reduce the effects of shock and vibration through absorptive and/or dampening materials and devices.

A problem with hardening structures and reinforcements is the addition of weight and volume on the objects or persons to be protected. Similar problems are experienced with known prior art absorption and dampening systems, which result in consumption of volume in transportation vehicles and usable space in enclosed environments, as well as discomfort for people wearing work and sport protective gear.

Traditional cushioning materials, such as solid foams, are an economically effective solution to protect small consumer goods during transportation and create lightweight protective gear such as helmets. However, they are typically not sufficient for protecting heavy equipment when transported on rough terrain or in situations where severe vibration or shock may be experienced. Large and heavy sensitive equipment is usually transported in wood crates on cushioning pallets that are labor intensive, expensive, usually single-use and too expensive to recycle. Similarly, foam protective helmets can offer only limited protection from impacts since impractical volumes of foam would be required to resist severe shocks.

Active and passive vibration control devices that are used in vehicles, aircraft and buildings to reduce the effects of severe shocks and vibration include shock absorbers, energy dampers, and isolation devices. These devices offer a higher level of protection, but their weight, size and cost quickly increase when scaling up the strength and energy dissipation capability of the device.

In view of the foregoing, a need exists for an improved system and methods for the reduction of the effects of shock and vibration in an effort to overcome the aforementioned obstacles and deficiencies of conventional protective systems, and reduce the additional weight, volume and cost required for said protection. Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a tri-adaptive apparatus configured for functioning as a dynamic force isolation and dampening metamaterial that reduces the transmission of vibrational and impact forces between a dynamic force source and an at least one object. In at least one embodiment, the apparatus provides an at least one unit cell comprising a pair of opposing first and second cell plates, an at least one nonlinear spring, and an at least one restrainer. An outer surface of the first cell plate is positioned in direct or indirect abutting contact with the dynamic force source. An outer surface of the second cell plate is positioned in direct or indirect abutting contact with the at least one object. The at least one nonlinear spring extends between an inner surface of each of the first and second cell plates along a substantially nonlinear path and configured for biasing the unit cell into a neutral state. The at least one restrainer is engaged with the inner surface of one of the first or second cell plates and extends a distance substantially perpendicularly therefrom, such that the at least one restrainer is positioned proximal to each of the at least one spring and the inner surface of the other of the first or second cell plates when the unit cell is in the neutral state. The at least one spring is configured for expanding and contracting laterally in the direction of the at least one restrainer upon being subjected to dynamic forces from the dynamic force source, thereby bringing the at least one spring into frictional sliding contact with the at least one restrainer and forming an at least one energy dissipative dashpot therebetween. Accordingly, the at least one spring, restrainer and dashpot are able to transfer dynamic force energy mutually between one another while deforming mechanically in response to the dynamic forces transmitted by the dynamic force source.

In at least one other embodiment, the apparatus provides an at least one unit cell comprising a pair of opposing first and second cell plates, an at least one nonlinear spring, and a plurality of restrainers. An outer surface of the first cell plate is positioned in direct or indirect abutting contact with the dynamic force source. An outer surface of the second cell plate is positioned in direct or indirect abutting contact with the at least one object. A pair of spaced apart first restrainers are engaged with an inner surface of the first cell plate and extend a distance substantially perpendicularly therefrom so as to be positioned proximal to an inner surface of the second cell plate when the unit cell is in a neutral state. A pair of spaced apart second restrainers are engaged with the inner surface of the second cell plate and extend a distance substantially perpendicularly therefrom so as to be positioned proximal to the inner surface of the first cell plate when the unit cell is in a neutral state. The at least one substantially horizontally-oriented spring is engaged with and extends between the first restrainers, the at least one spring configured for biasing the unit cell into a neutral state. The at least one spring is further configured for expanding and contracting laterally in the direction of the first and second restrainers upon being subjected to dynamic forces from the dynamic force source, thereby bringing the first restrainers into frictional sliding contact with the second restrainers and forming an at least one energy dissipative dashpot therebetween. Accordingly, the at least one spring, restrainer and dashpot are able to transfer dynamic force energy mutually between one another while deforming mechanically in response to the dynamic forces transmitted by the dynamic force source.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 16 is an exploded view of a still further exemplary unit cell of the apparatus, in accordance with at least one embodiment;

FIG. 17 is an exploded view of a still further exemplary unit cell of the apparatus, in accordance with at least one embodiment;

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
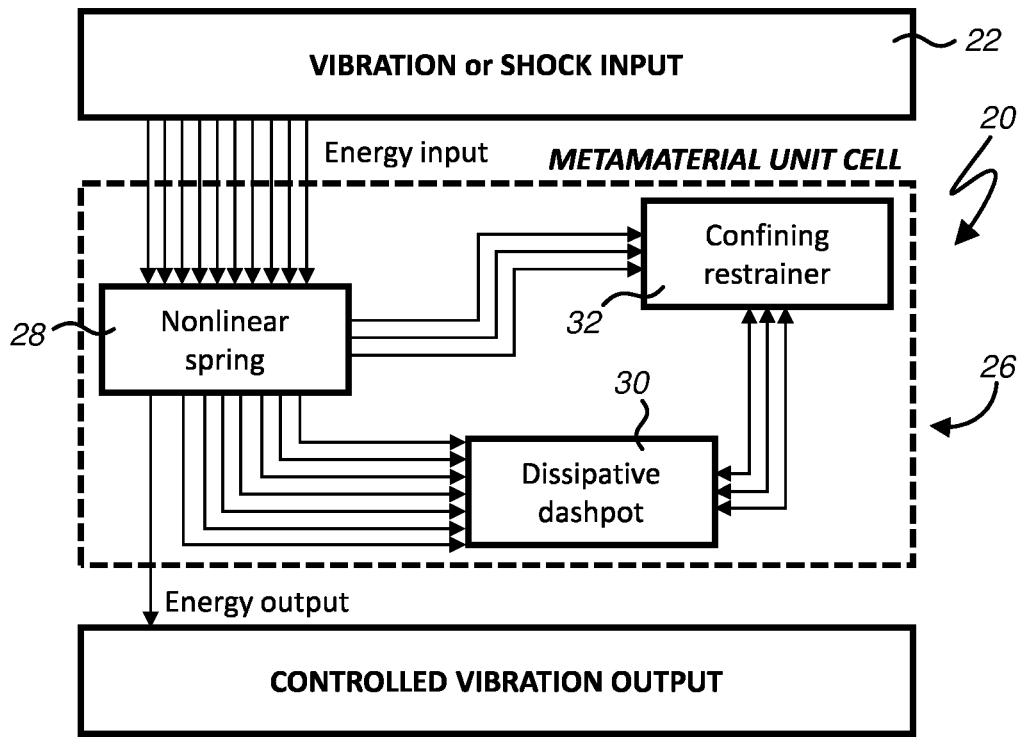
FIG. 1 is a schematic view of an exemplary tri-adaptive apparatus, in accordance with at least one embodiment.
Figure 2:
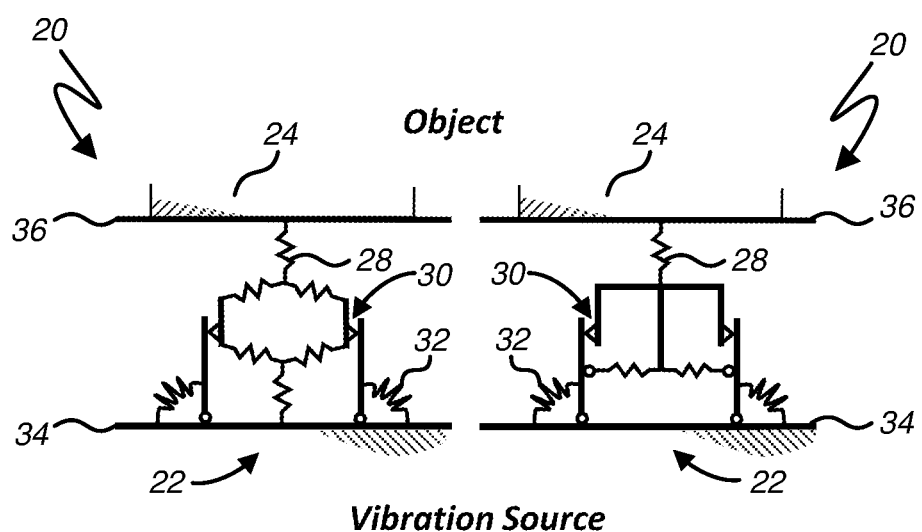
FIG. 2 is a diagrammatic view of rheological models for two exemplary embodiments of the tri-adaptive apparatus, in accordance with at least one embodiment.

Turning now to FIG. 1, there is shown a schematic view of an exemplary tri-adaptive apparatus 20, in accordance with at least one embodiment, configured for functioning as a shock and/or vibration (hereinafter collectively referred to as "vibration" or "dynamic force" for simplicity purposes) isolation and dampening metamaterial that reduces or eliminates the transmission of dynamic force from a vibrating surface or other vibration and/or impact source 22 (hereinafter collectively referred to as a "dynamic force source" 22 for simplicity purposes) to an at least one object 24 (FIG. 2). The object 24 may be any type of object, now known or later developed, that could benefit from being protected from dynamic forces, including but in no way limited to cargo, satellites, batteries, IT equipment, electronic equipment, avionics equipment, buildings, sports, protective equipment, etc. Accordingly, while the apparatus 20 may be shown and described herein in the context of certain types of objects and/or use cases for illustrative purposes, the apparatus 20 should not be read as being so limited.

In at least one embodiment, the apparatus 20 comprises an at least one unit cell 26 that itself comprises an at least one nonlinear spring 28, an at least one energy dissipative dashpot 30, and an at least one confining restrainer 32; said components arranged as a relatively thin layer positioned between a pair of opposing first and second cell plates 34 and 36, such that the at least one spring 28, restrainer 32 and dashpot 30 are able to transfer dynamic force energy mutually between one another (i.e., tri-adaptive) while deforming mechanically in response to the dynamic forces transmitted by the dynamic force source. Accordingly, in at least one such embodiment and as discussed in detail below, the apparatus is capable of adapting its isolation, damping, and strength properties to the level of the dynamic excitation it might experience, while being relatively lightweight and compact in shape. In that regard, it should be noted that the sizes, shapes, dimensions, quantities and relative positions of the at least one unit cell 26 and its various components (including but not limited to the at least one spring 28, dashpot 30, restrainer 32, and opposing first and second cell plates 34 and 36) as depicted in the drawings (and as described herein) are merely exemplary. In further embodiments, the at least one unit cell 26 and each of its various components may take on any other sizes, shapes, dimensions, quantities and/or relative positions, now known or later developed, so long as the at least one unit cell 26—and, in turn, the apparatus 20 in which the at least one unit cell 26 is incorporated—is capable of substantially carrying out the functionality described herein.

Figure 3:
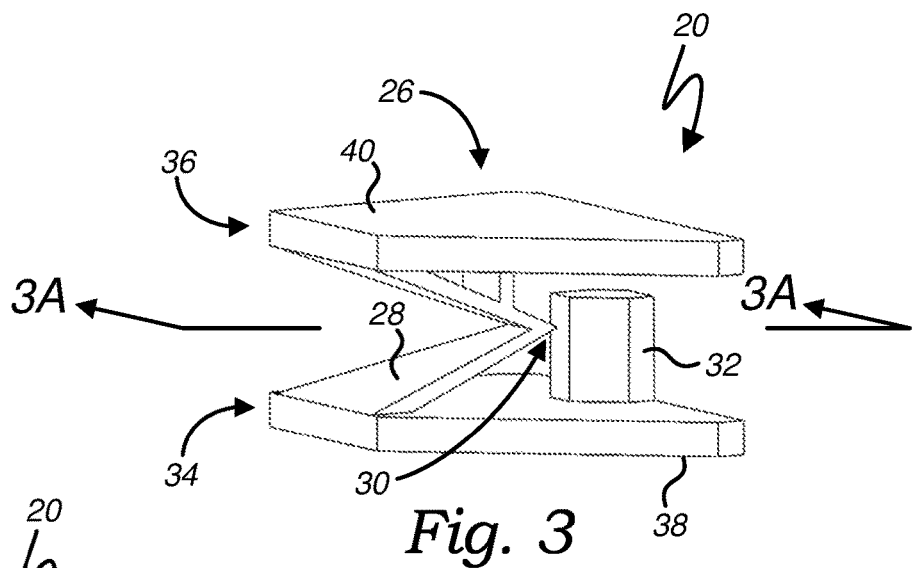
FIG. 3 is a perspective view of an exemplary unit cell of the apparatus, in accordance with at least one embodiment
Figure 3A:
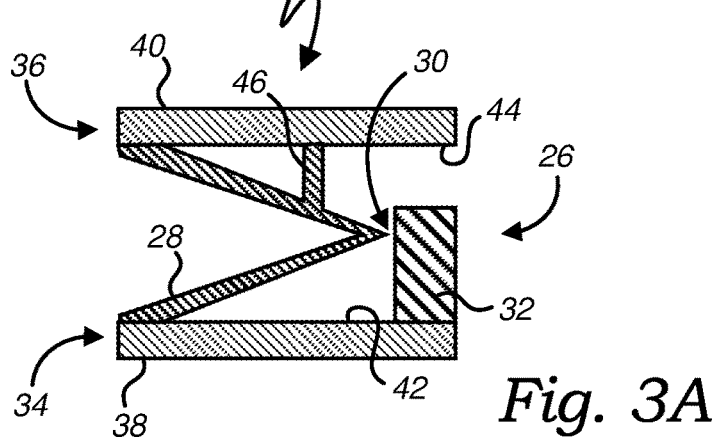
FIG. 3A is a cross-sectional view taken along line 3A-3A of FIG. 3.

In at least one embodiment, as illustrated in FIGS. 3 and 3A, an outer surface 38 of the first cell plate 34 is positioned in direct or indirect abutting contact with the dynamic force source 22, while an outer surface 40 of the opposing second cell plate 36 is positioned in direct or indirect abutting contact with the object 24 to be protected. In at least one embodiment, the at least one spring 28 extends between inner surfaces 42 and 44 of the first and second cell plates 34 and 36 along a substantially nonlinear path. In at least one embodiment, the at least one spring 28 is configured as one or more thin-walled plates.

However, in further embodiments, the at least one spring 28 may be configured as or constructed out of any other materials and/or components, now known or later developed—dependent at least in part on the specific context in which the apparatus 20 is to be utilized—so long as the apparatus 20 is capable of substantially carrying out the functionality described herein. In at least one embodiment, the at least one unit cell 26 further provides an at least one spring strut 46 extending between the at least one spring 28 and the inner surface 44 of the second cell plate 36 for forcing a controlled deformation of the spring 28 when one of the first or second cell plates 34 or 36 is subjected to dynamic forces from the dynamic force source 22. In at least one embodiment, the at least one restrainer 32 is constructed out of a relatively flexible material. Each of the at least one restrainer 32 is engaged with the inner surface 42 or 44 of one of the first or second cell plates 34 or 36 and extends a distance substantially perpendicularly therefrom, such that said restrainer 32 is positioned proximal to (i.e., either spaced a distance apart from or in abutting contact with) each of the at least one spring 28 and the inner surface 42 or 44 of the other of the first or second cell plates 34 or 36 when the unit cell 26 is in a neutral state (i.e., when no dynamic forces are acting upon the unit cell 26). In at least one embodiment, the at least one restrainer 32 is engaged with the inner surface 42 or 44 of the first or second cell plate 36 via a rotational spring.

In at least one embodiment, the at least one unit cell 26 is configured such that dynamic forces from the dynamic force source 22 will cause the spring 28 to deform vertically while also expanding and contracting laterally. Additionally, the spring 28 is configured for biasing the unit cell 26 into the neutral state. Accordingly, when the unit cell 26 is in a compressed state (i.e., when the spring 28 is compressed), the spring 28 expands laterally such that the space between the spring 28 and the restrainer 32 is decreased until the spring 28 is brought into frictional sliding contact with the restrainer 32; and when the unit cell 26 is in the neutral state (i.e., when the dynamic forces from the dynamic force source 22 cease), the spring 28 contracts laterally such that the spring 28 moves out of frictional sliding contact with the restrainer 32. In at least one embodiment, the frictional sliding contact between the spring 28 and the restrainer 32 represents and functions as the at least one dashpot 30. The friction force at the sliding point of contact between the spring 28 and restrainer 32 dissipates energy due to the point of contact moving because of the vertical deformation of the spring 28. The larger the dynamic excitation, the larger the vertical deformation of the spring 28, the contact force between the spring 28 and restrainer 32, and the amount of friction force at that point of contact, which, in turn, results in a higher amount of dissipated dynamic energy throughout the sliding contact. It should be noted that the term "vertical" is used herein to define an orientation or direction which is substantially perpendicular to the first and second cell plates 34 and 36, while the terms "horizontal" and "lateral" are used herein to define an orientation or direction which is substantially parallel with the first and second cell plates 34 and 36—regardless of the specific orientation of the first and second cell plates 34 and 36 in a given embodiment.

Figure 9:
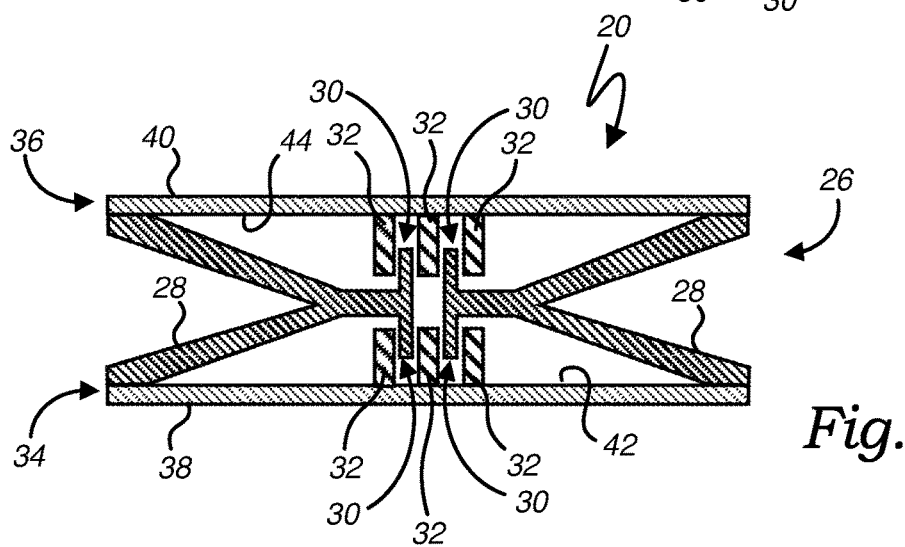
FIG. 9 is a cross-sectional view of a still further exemplary unit cell of the apparatus, in accordance with at least one embodiment.
Figure 11:
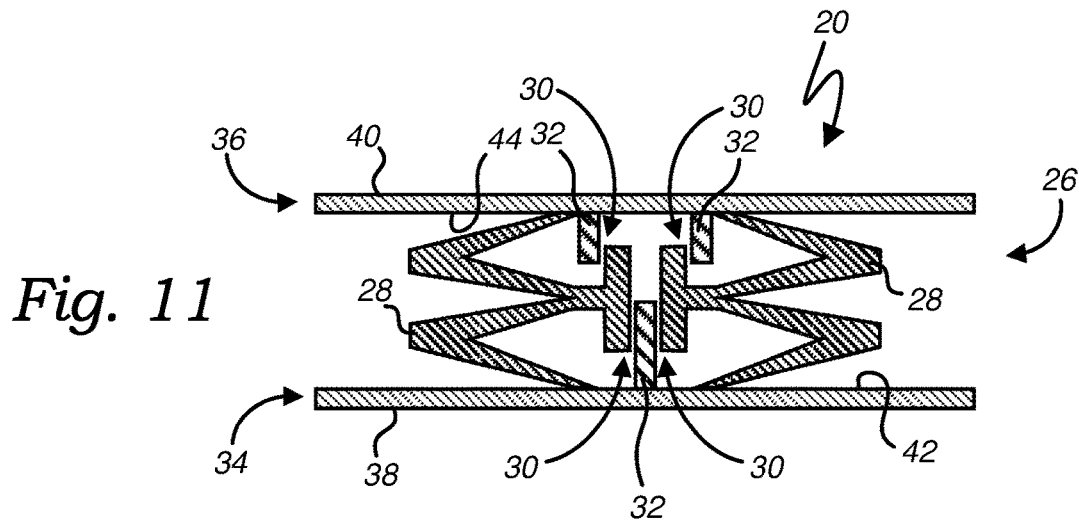
FIG. 11 is a cross-sectional view of a still further exemplary unit cell of the apparatus, in accordance with at least one embodiment.
Figure 12:
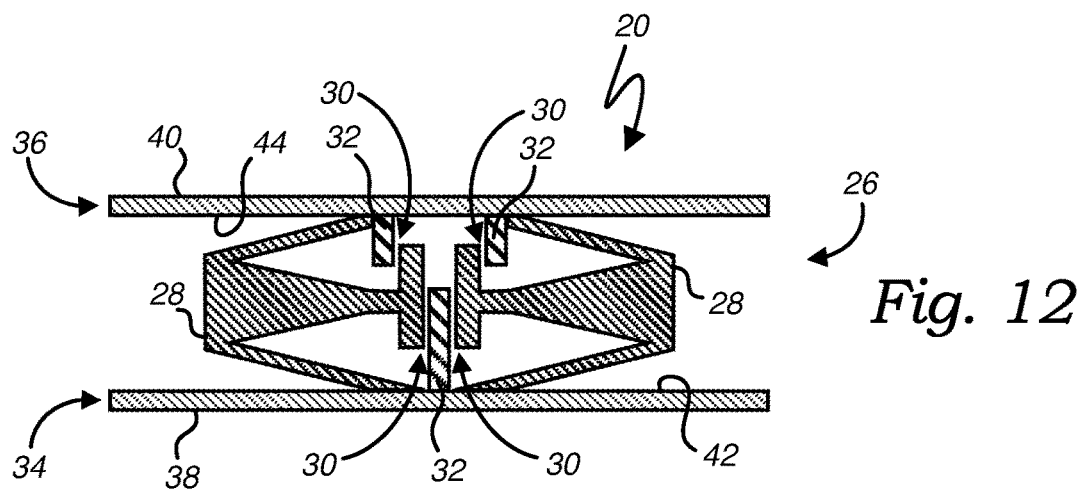
FIG. 12 is a cross-sectional view of a still further exemplary unit cell of the apparatus, in accordance with at least one embodiment.

In at least one embodiment, where the dashpot 30 is the frictional sliding contact between the spring 28 and the restrainer 32, the dashpot 30 may be machined, chemically treated, or lined with a different material to modify the frictional property between the spring 28 and the restrainer 32. In at least one alternate embodiment, as illustrated in FIGS. 9, 11 and 12, the at least one dashpot 30 is integral with the at least one spring 28 and positioned substantially at a vertex of the spring 28. In at least one further alternate embodiment, the at least one dashpot 30 may comprise any other mechanism, now known or later developed—such as a viscoelastic or hysteretic material connecting the spring 28 to the restrainer 32, for example—capable of slowing the motion of the spring 28 relative to the restrainer 32 while also absorbing an amount of the dynamic energy from the dynamic force source 22.

In at least one embodiment, each of the spring 28, dashpot 30, restrainer 32, first cell plate 34 and second cell plate 36 is constructed out of one or more of metal, metal alloys, polymeric materials, ceramic materials, composite materials, or bio-based materials. However, in further embodiments, the unit cell 26 or one or more of its components (including but not limited to the spring 28, dashpot 30, restrainer 32, first cell plate 34 and second cell plate 36) may be constructed out of any other materials (or combinations of materials), now known or later developed—dependent at least in part on the specific context in which the apparatus 20 is to be utilized—so long as the at least one unit cell 26—and, in turn, the apparatus 20 in which the at least one unit cell 26 is incorporated—is capable of substantially carrying out the functionality described herein. Accordingly, the materials of construction are dependent, at least in part, on the particular context in which the apparatus 20 is to be utilized. Additionally, the dimensions of the at least one unit cell 26, along with the dimensions of the apparatus 20, is dependent, at least in part, on the particular context in which the apparatus is to be utilized.

Figure 4:
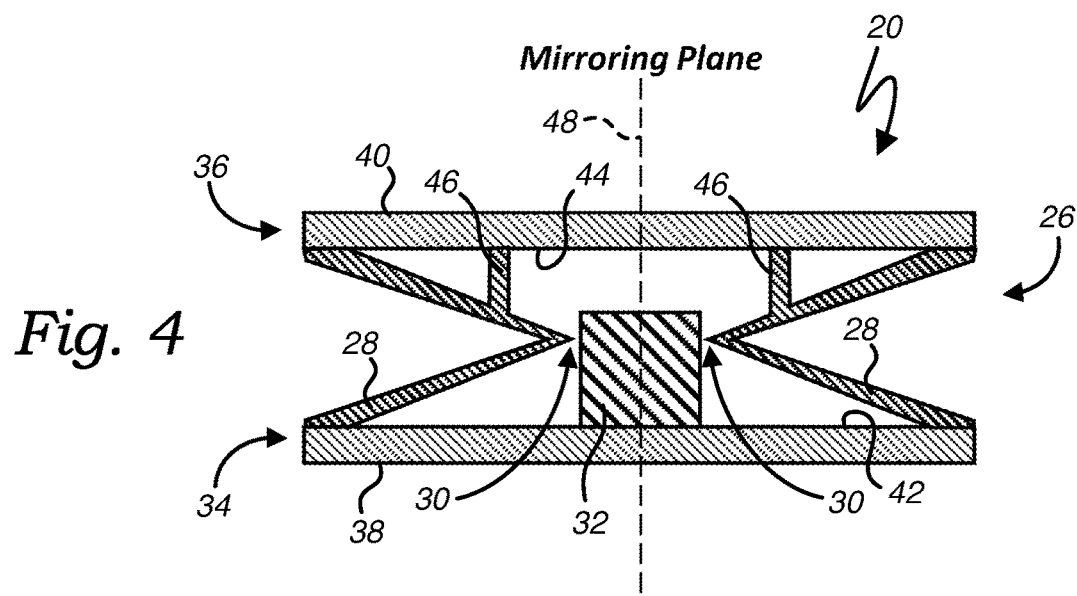
FIG. 4 is a cross-sectional view of a further exemplary unit cell of the apparatus, in accordance with at least one embodiment.
Figure 5:
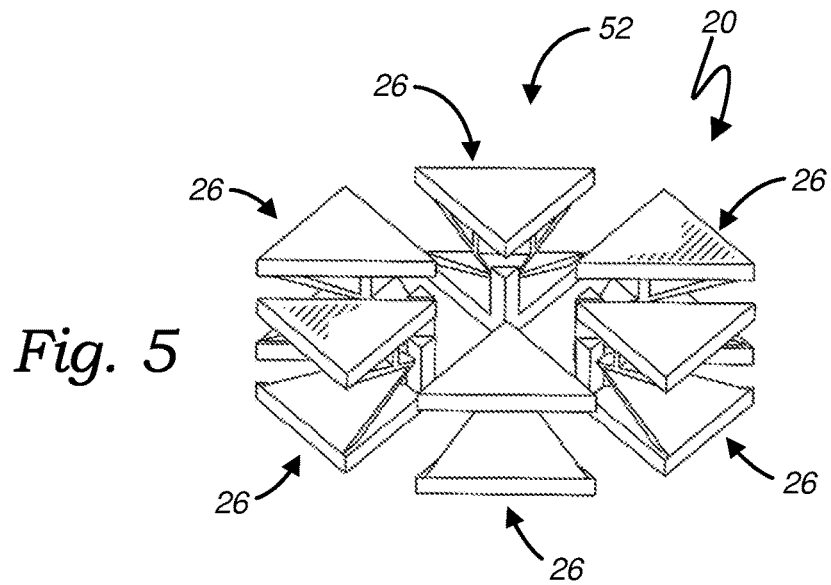
FIG. 5 is a perspective view of a plurality of exemplary unit cells radially arranged about an imaginary vertical axis, in accordance with at least one embodiment.

In at least one further embodiment, as illustrated in FIG. 4, the components of the unit cell 26 are mirrored about an imaginary vertical plane 48 positioned proximal to the at least one restrainer 32, thereby forming a relatively larger, symmetrical unit cell 26. Similarly, in at least one still further embodiment, as illustrated in FIG. 5, the entire unit cell 26 is mirrored and radially arranged about an imaginary vertical plane 48 positioned proximal to the at least one restrainer 32, thereby forming a relatively larger, symmetrical grouping of unit cells 26.

Figure 6:
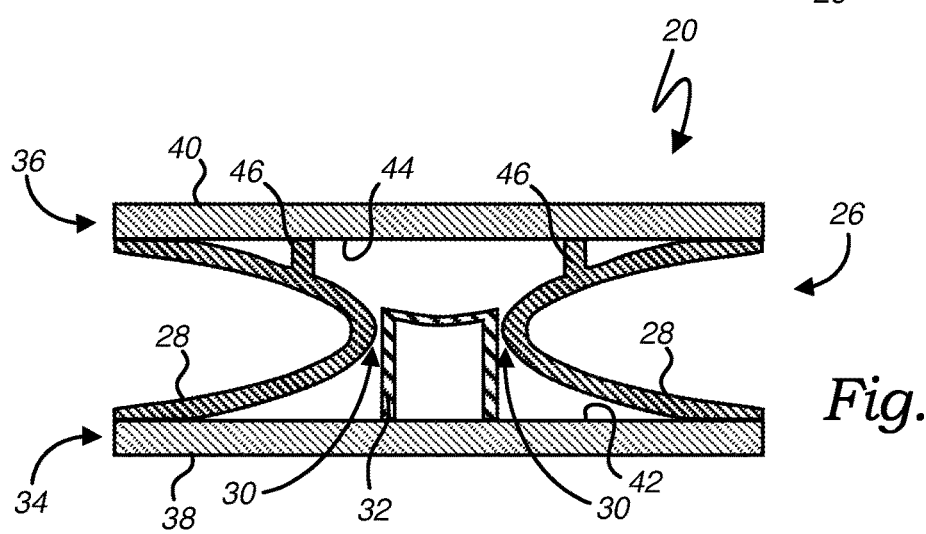
FIG. 6 is a cross-sectional view of a still further exemplary unit cell of the apparatus, in accordance with at least one embodiment.
Figure 7:
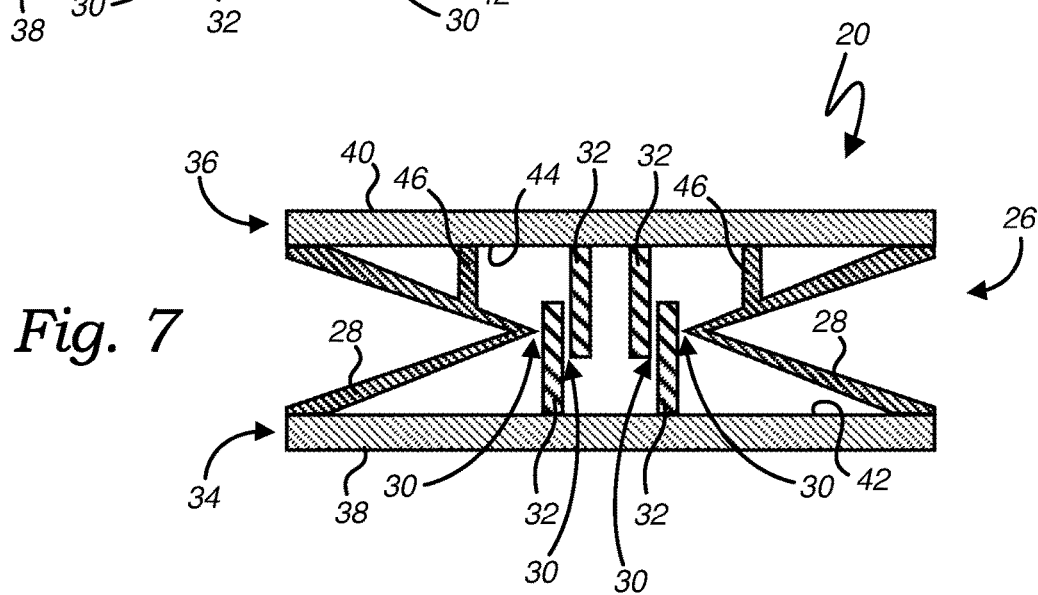
FIG. 7 is a cross-sectional view of a still further exemplary unit cell of the apparatus, in accordance with at least one embodiment.
Figure 8:
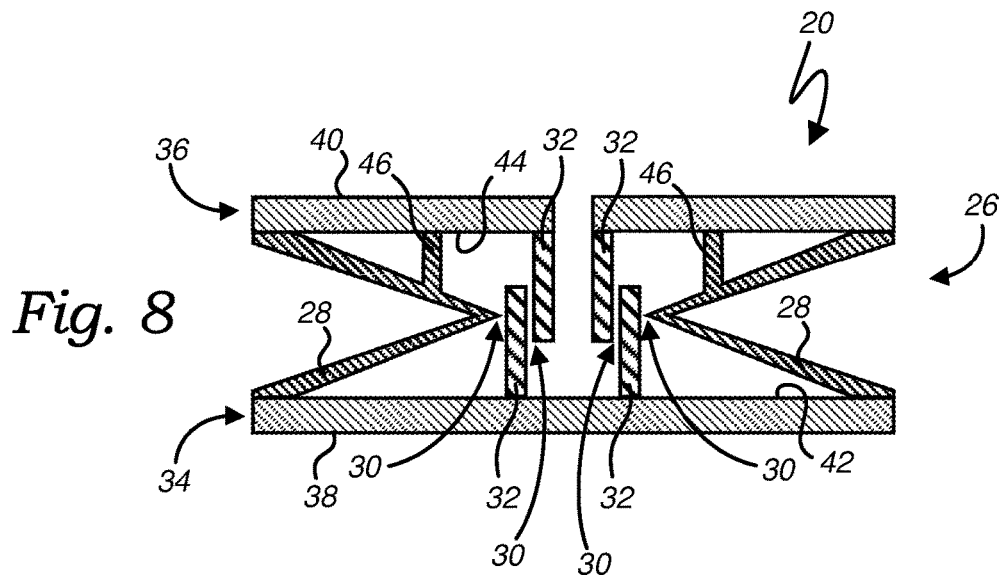
FIG. 8 is a cross-sectional view of a still further exemplary unit cell of the apparatus, in accordance with at least one embodiment.
Figure 10:
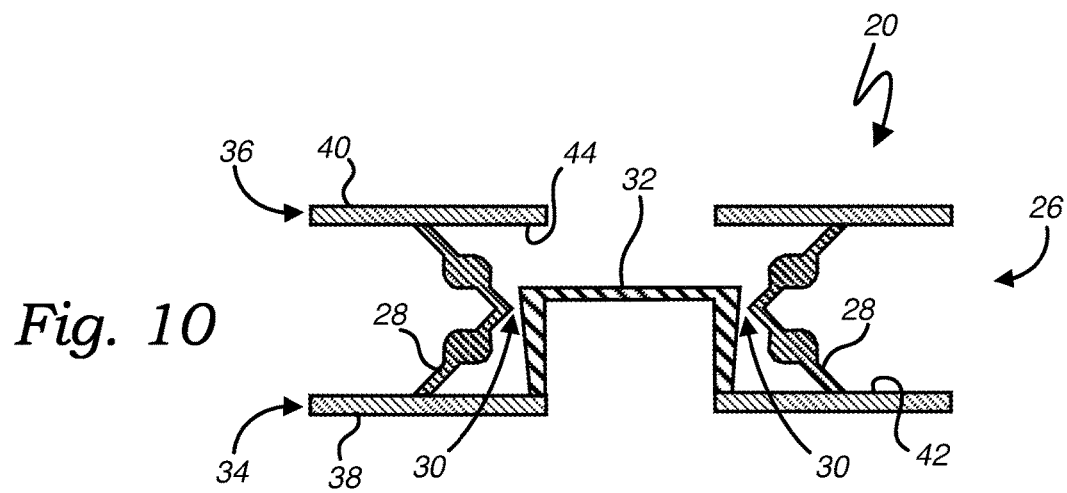
FIG. 10 is a cross-sectional view of a still further exemplary unit cell of the apparatus, in accordance with at least one embodiment.

As noted above, the at least one unit cell 26 and each of its various components may take on any other sizes, shapes, dimensions, quantities and/or relative positions, now known or later developed, so long as the at least one unit cell 26—and, in turn, the apparatus in which the at least one unit cell 26 is incorporated—is capable of substantially carrying out the functionality described herein. In at least one such alternate embodiment, the at least one spring 28 may take on other nonlinear shapes—such as an elliptical shape (FIG. 6) for example—may have a variable thickness (FIG. 10) rather than a uniform thickness, and may have a relatively rigid core (FIG. 12) for providing additional stiffness and strength. Additionally, in at least one alternate embodiment, as also illustrated in FIG. 6, the at least one restrainer 32 may be hollow in construction rather than solid. In at least one further alternate embodiment, as illustrated in FIG. 7, the at least one unit cell 26 may provide a plurality of restrainers 32 in frictional sliding contact with one another, such that the unit cell 26 provides an at least one further dashpot 30 positioned between said restrainers 32. In at least one still further alternate embodiment, as illustrated in FIGS. 8 and 10, one or both of the first or second cell plates 34 or 36 is discontinuous in structure rather than being continuous. In at least one such embodiment, where the first cell plate 34 is discontinuous in structure, as illustrated in FIG. 10, the at least one restrainer 32 may be positioned and configured for interconnecting the discontinuous first cell plate 34. In at least one still further alternate embodiment, as illustrated in FIG. 9, the at least one spring strut 46 may be omitted. In at least one still further alternate embodiment, as illustrated in FIGS. 9, 11 and 12, where the at least one dashpot 30 is integral with the at least one spring 28 and positioned substantially at a vertex of the spring 28, the at least one unit cell 26 provides a plurality of restrainers 32 positioned on the inner surface 42 or 44 of one or both of the first or second cell plates 34 or 36 for frictionally contacting opposing inner and outer surfaces of the at least one dashpot 30.

Figure 13:
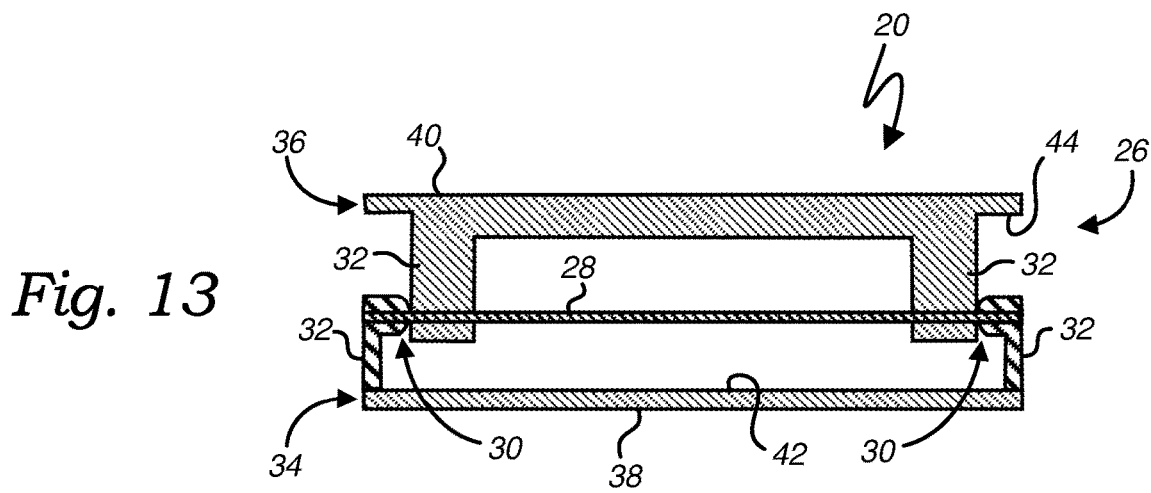
FIG. 13 is a cross-sectional view of a still further exemplary unit cell of the apparatus, in accordance with at least one embodiment.
Figure 14:
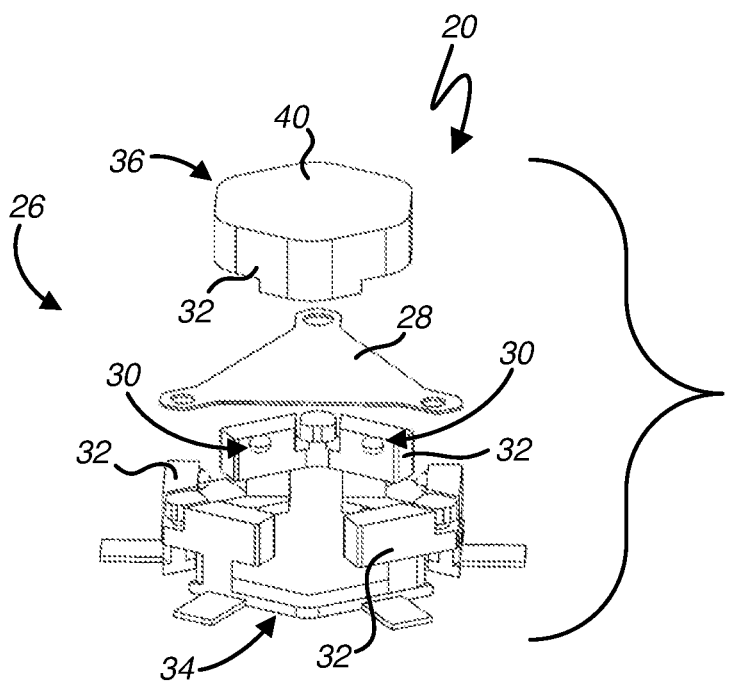
FIG. 14 is an exploded view of a still further exemplary unit cell of the apparatus, in accordance with at least one embodiment.
Figure 15:
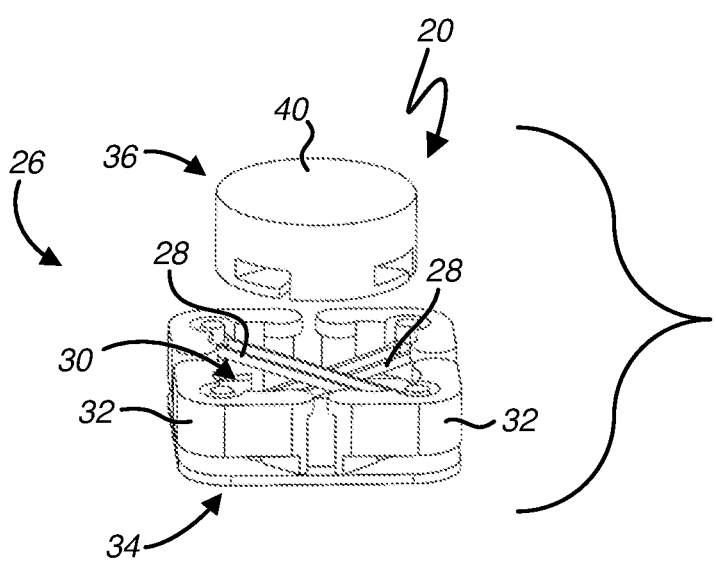
FIG. 15 is an exploded view of a still further exemplary unit cell of the apparatus, in accordance with at least one embodiment.

In at least one alternate embodiment, as illustrated in FIGS. 13 and 14, the at least one spring 28 is a thin-walled, planar, substantially horizontally-oriented membrane extending between opposing restrainers 32 provided by the inner surface 42 of the first cell plate 34. In at least one alternate embodiment, as illustrated in FIG. 15, the membrane of the at least one spring 28 is configured as an elongated band or string. In at least one embodiment, the at least one spring 28 is constructed out of a resilient material, such as rubber for example. However, in further embodiments, the at least one spring 28 may be constructed out of any other materials (or combinations of materials), now known or later developed—dependent at least in part on the specific context in which the apparatus 20 is to be utilized—so long as the at least one unit cell 26—and, in turn, the apparatus 20 in which the at least one unit cell 26 is incorporated—is capable of substantially carrying out the functionality described herein. Additionally, in at least one such embodiment, as best illustrated in FIG. 13, the inner surface 44 of the second cell plate 36 provides a further at least one restrainer 32 extending a distance substantially perpendicularly therefrom for coming into frictional sliding contact with a corresponding one of the restrainers 32 provided by the first cell plate 34. In at least one such embodiment, the further at least one restrainer 32 provided by the second cell plate 36 is a circumferential sidewall of the second cell plate 36. Accordingly, when the unit cell 26 is in a compressed state, the spring 28 deforms vertically and contracts laterally such that the space between the restrainers 32 of the first and second cell plates 34 and 36 is decreased until said restrainers 32 are brought into frictional sliding contact with one another. In at least one embodiment, the frictional sliding contact between the restrainers 32 of the first and second cell plates 34 and 36 represents and functions as the at least one dashpot 30. The frictional force at the points of contact dissipates energy due to the points of contact moving because of the vertical deformation of the spring 28. The larger the dynamic excitation, the larger the vertical deformation of the spring 28, the contact force between the restrainers 32 of the first and second cell plates 34 and 36, and the amount of friction force at those points of contact, which, in turn, results in a higher amount of dissipated dynamic energy throughout the sliding contact. In at least one alternate embodiment, the further at least one restrainer 32 provided by the second cell plate 36 is omitted, such that the at least one spring 28 is in frictional sliding contact with the restrainers 32 provided by the first cell plate 34.

In at least one alternate embodiment, as illustrated in FIGS. 16 and 17, the at least one unit cell 26 provides an at least one securing element 56 configured for joining each of the at least one spring 28, dashpot 30, restrainer 32, and opposing first and second cell plates 34 and 36 together. In at least one such embodiment, the at least one securing element 56 provides a snap-fit engagement, thereby allowing the unit cell 26 to be quickly and easily assembled. In further embodiments, the at least one securing element 56 may be configured for joining each of the at least one spring 28, dashpot 30, restrainer 32, and opposing first and second cell plates 34 and 36 together using any other type of permanent or non-permanent engagement mechanisms, now known or later developed.

FIG. 2 is a diagrammatic view of rheological models for two exemplary embodiments of the apparatus 20 as positioned between the dynamic force source 22 and the object 24 to be protected. The first (i.e., lefthand) exemplary rheological model is illustrative of the embodiments depicted in FIGS. 3-12; while the second (i.e., righthand) exemplary rheological model is illustrative of the embodiments depicted in FIGS. 13-17. In at least one embodiment, when a dynamic force originating from the dynamic force source 22 enters the apparatus 20 through the first cell plate 34, the spring 28 (represented in FIG. 2 as a set of deformable interconnected springs acting in multiple directions) is designed to react by developing primary deformations in the direction of the dynamic energy and secondary deformations with each of the dashpot 30 (represented in FIG. 2 as friction sliders) and restrainer 32 (represented in FIG. 2 as linear springs) in a direction normal to the dynamic energy. In at least one embodiment, the secondary deformations are designed to cause a frictional sliding contact between the spring 28 and the restrainer 32. The forces between the spring 28 and the restrainer 32 cause deformation and relative motion of the spring 28 and the restrainer 32, resulting in dynamic energy dissipated and mechanical energy absorbed and transmitted back to the spring 28 by the restrainer 32. This interaction causes a tri-partition of the dynamic energy, which is split unevenly and flows between each of the spring 28, dashpot 30, restrainer 32 based on their respective mechanical properties. In the first (i.e., lefthand) exemplary rheological model illustrated in FIG. 2, the spring 28 pushes the restrainer 32 when the spring 28 is subjected to compression forces, and the spring 28 pulls the restrainer 32 when the spring 28 is subjected to tension forces.

In the second (i.e., righthand) exemplary rheological model illustrated in FIG. 2, the spring 28 pulls the restrainer 32 when the spring 28 is subjected to either compression or tension forces. In a bit more detail, in at least one such embodiment, when a dynamic force originating from the dynamic force source 22 enters the apparatus 20 through the first cell plate 34, the dynamic forces cause the spring 28 to deform vertically and expand and contract laterally, closing and opening the gap between the restrainers 32 of the first and second cell plates 34 and 36. The frictional sliding contact between the restrainers 32 of the first and second cell plates 34 and 36 represents and functions as the at least one dashpot 30. The frictional force at the points of contact dissipates energy due to the points of contact moving because of the vertical deformation of the spring 28. The larger the dynamic excitation, the larger the vertical deformation of the spring 28, the contact force between the restrainers 32 of the first and second cell plates 34 and 36, and the amount of friction force at those points of contact, which, in turn, results in a higher amount of dissipated dynamic energy throughout the sliding contact.

In other words, in each embodiment, the at least one spring 28, restrainer 32 and dashpot 30 are able to activate one another and transfer dynamic force energy mutually between one another (i.e., tri-adaptive) while deforming mechanically in response to the dynamic forces transmitted by the dynamic force source. As such, the at least one spring 28, restrainer 32 and dashpot 30 are able to adapt their behavior to each other's behavior, thereby providing optimal protection from dynamic forces.

FIG. 1 illustrates the energy flow between each of the spring 28, dashpot 30, restrainer 32, and opposing first and second cell plates 34 and 36, in accordance with at least one embodiment. In at least one such embodiment, a dynamic force originating from the dynamic force source 22 enters the apparatus 20 through the first cell plate 34 and is transferred to the at least one spring 28. A portion of the dynamic force is transferred by the spring 28 to the dashpot 30, while another portion of the dynamic force is transferred to the restrainer 32. The dashpot 30 and the restrainer 32 each exchange dynamic energy through mutual deformation and relative motion. Accordingly, the restrainer 32 reacts to restrain the deformation of the spring 28, thus transferring a portion of the dynamic force from the spring 28 back into the spring 28. Thus, in at least one embodiment, this energy tri-partition functionality that is achieved through cooperation between the spring 28, dashpot 30 and restrainer 32 within the unit cell 26 has the effect of modifying and reducing the dynamic energy that reaches the opposing second cell plate 36 of the unit cell 26, which is in contact with the object 24 to be protected, thereby resulting in a controlled dynamic force.

The design of the mutually interactive behavior is based on the input energy content. The dynamic energy on the first cell plate 34 firstly enters the spring 28, which is calibrated to absorb most of the dynamic energy in the form of strain mechanical energy. The strain mechanical energy is absorbed through a nonlinear interaction between the deformations of the spring 28 in non-parallel directions. Through those deformations, the greater the amount of dynamic energy that is absorbed by the spring 28, the greater the amount of dynamic energy is transferred into the dashpot 30, which dissipates the dynamic energy to dampen the effects of the dynamic force and, through the dashpot 30, into the restrainer 32, which restrains one deformation component of the spring 28, causing additional deformation of the spring 28 in non-parallel directions. By doing so, the restrainer 32 partially transfers an amount of mechanical energy back into the spring 28, to provide increased resistance to the stresses induced by the dynamic energy. The restrainer 32 and the dashpot 30 interact with one other to balance the dynamic energy transfer from and to the spring 28 and achieve an optimal combination of confining and dampening effects that adapts to different levels of the dynamic excitation. As a result of the adaptable dynamic energy absorption, dissipation, confinement, and mutual energy transferring mechanisms in at least one embodiment, only a fraction of the dynamic energy experienced by the first cell plate 34 is subsequently transferred to the opposing second cell plate 36 and into the object 24, thereby resulting in a highly controlled vibration for a wide range of vibration inputs.

Figure 18:
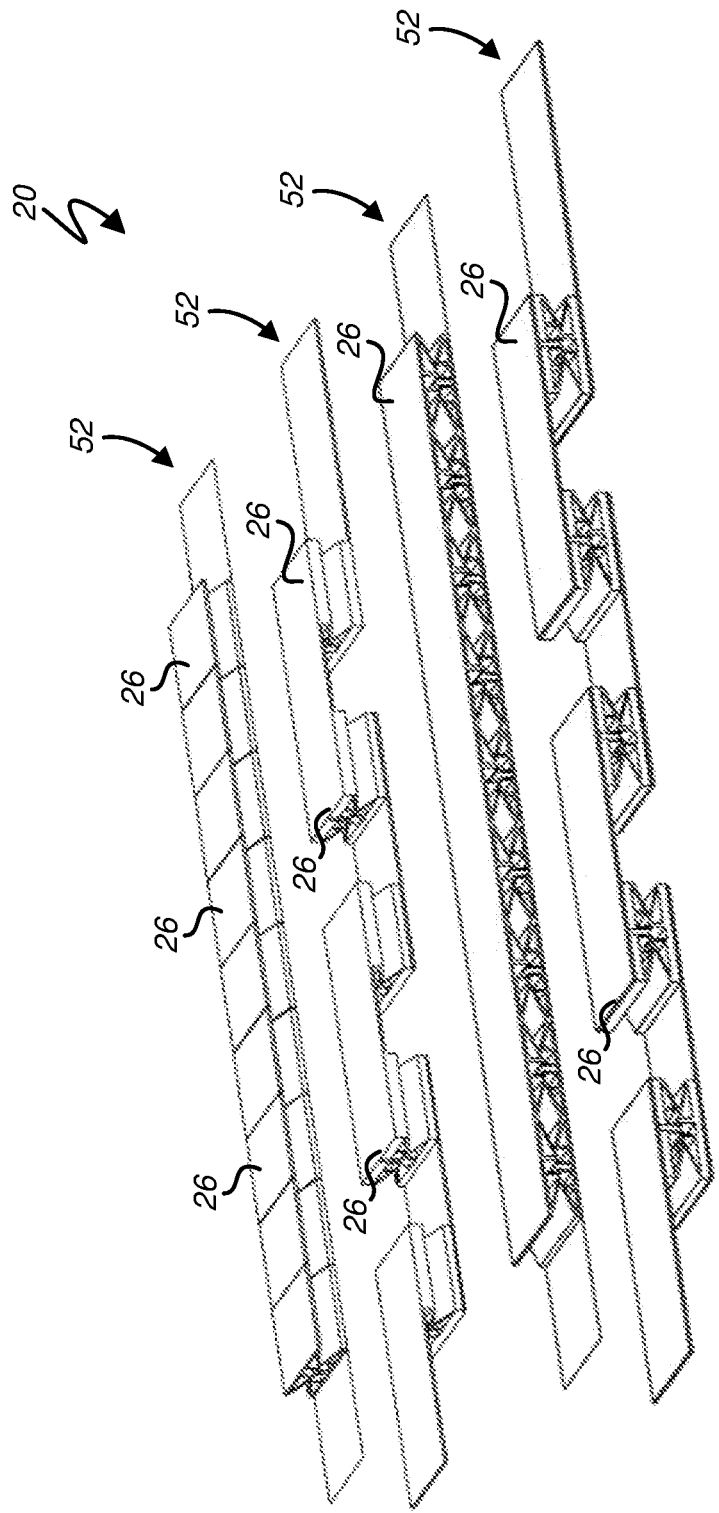
FIG. 18 is a perspective view of exemplary cell assemblies containing a plurality of linearly arranged unit cells, in accordance with at least one embodiment.

In at least one embodiment, as illustrated in FIG. 18, the apparatus 20 comprises a plurality of unit cells 26 positioned in a side-by-side arrangement. For illustrative purposes, a plurality of unit cells 26 positioned in a side-by-side arrangement is referred to herein as a "cell assembly" 52. In at least one such embodiment, the unit cells 26 of a given cell assembly 52 are all oriented in substantially the same direction. Additionally, in at least one embodiment, a given cell assembly 52 may comprise a plurality of unit cells 26 that are aligned into a linear strip and joined together via one or both of their respective first or second cell plates 34 or 36, as illustrated in the various exemplary embodiments depicted in FIG. 18. In at least one such embodiment, the unit cells 26 of a given cell assembly 52 may be oriented longitudinally with respect to a length of the cell assembly 52. In at least one alternate embodiment, the unit cells 26 of a given cell assembly 52 may be oriented perpendicularly with respect to the length of the cell assembly 52. In at least one further alternate embodiment, the unit cells 26 of a given cell assembly 52 may be oriented both longitudinally and perpendicularly in an alternating pattern with respect to a length of the cell assembly 52. Additionally, in at least one embodiment, the unit cells 26 of a given cell assembly 52 may be contiguously positioned relative to one another; while in at least one alternate embodiment, one or more of the unit cells 26 of a given cell assembly 52 may be non-contiguously positioned.

Figure 19:
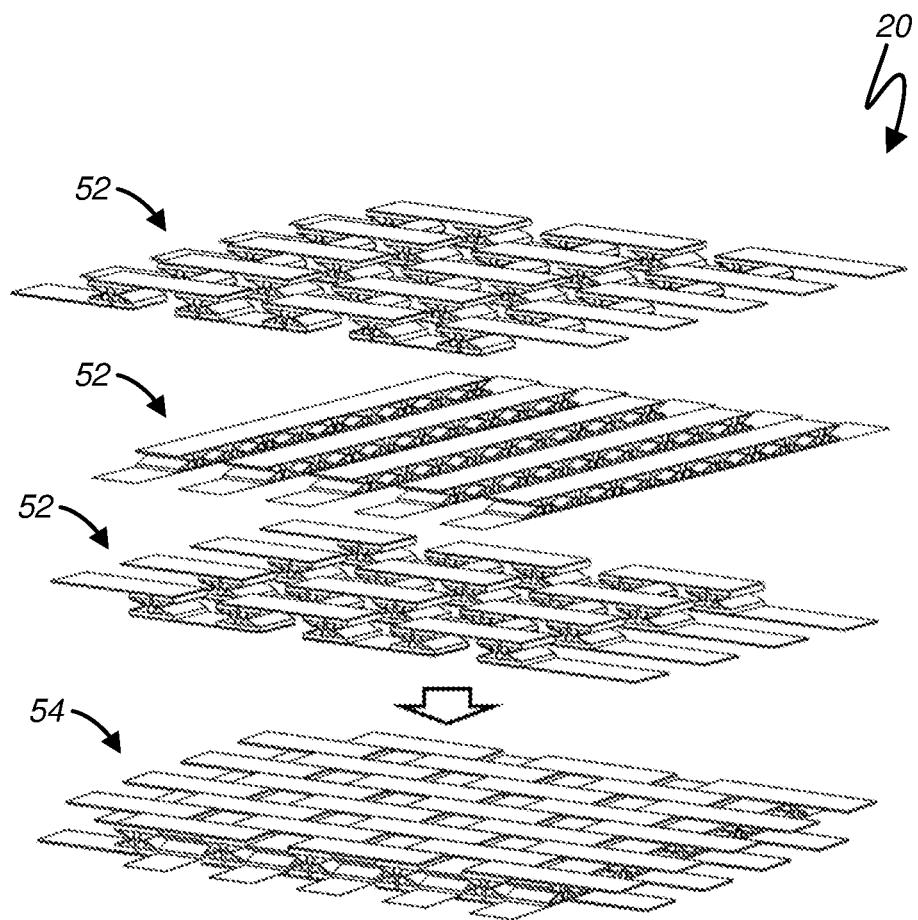
FIG. 19 is an exploded view of exemplary cell assemblies interconnected in a side-by-side arrangement, in accordance with at least one embodiment.
Figure 20:
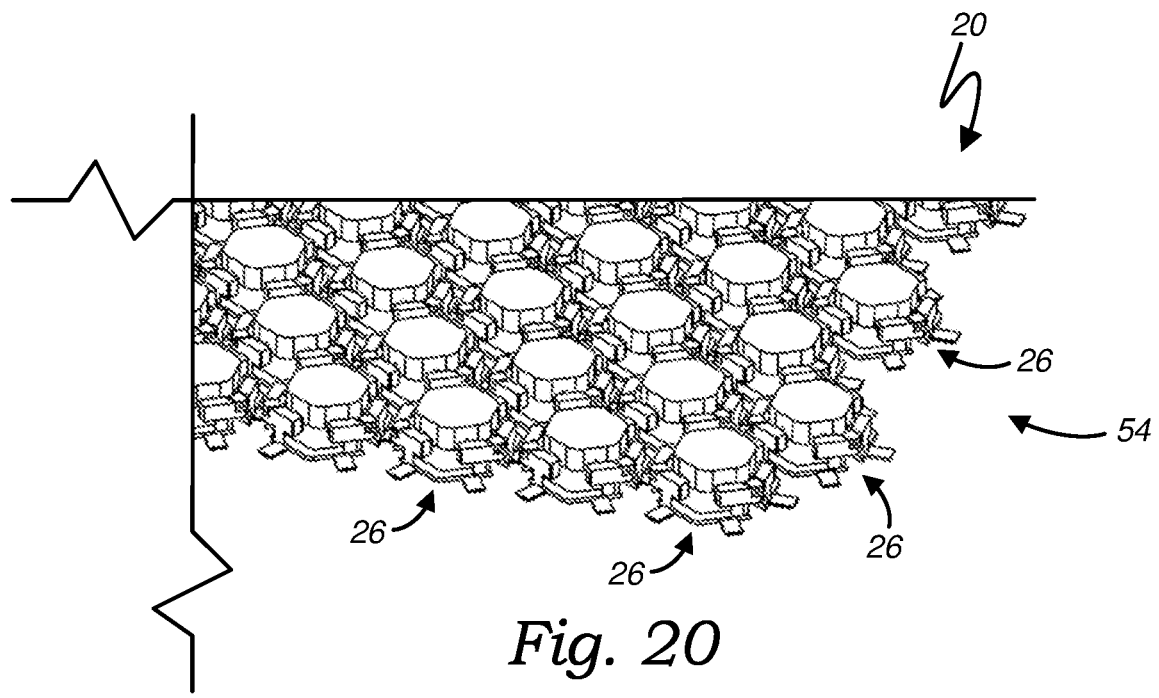
FIG. 20 is a partial perspective view of still further exemplary cell assembly, in accordance with at least one embodiment.
Figure 21:
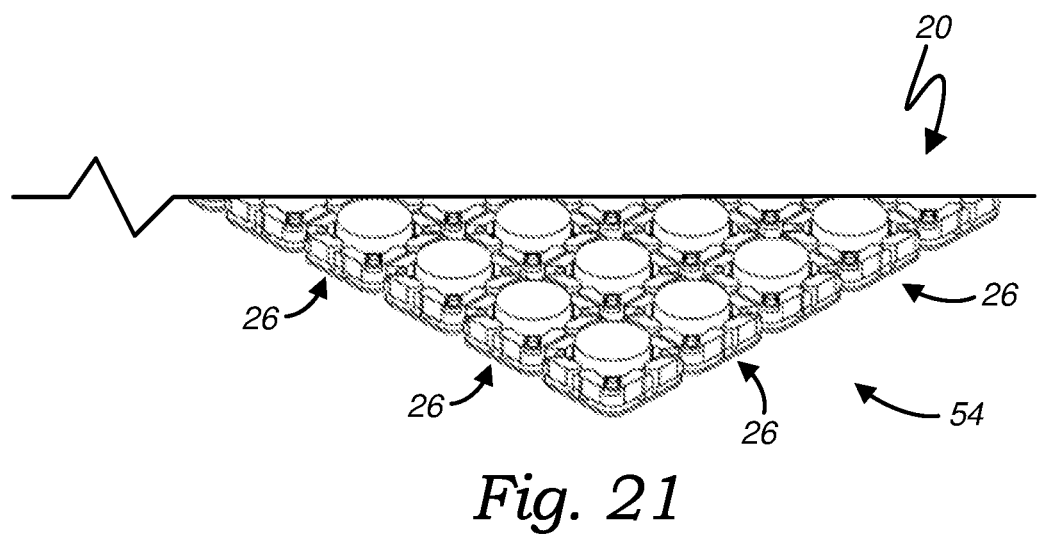
FIG. 21 is a partial perspective view of still further exemplary cell assembly, in accordance with at least one embodiment.

In at least one embodiment, as illustrated in FIGS. 19-21, the apparatus 20 comprises a plurality of cell assemblies 52 positioned in a side-by-side arrangement. For illustrative purposes, a plurality of cell assemblies 52 positioned in a side-by-side arrangement is referred to herein as a "assembly layer" 54. These assembly layers 54 may take on virtually any sizes, shapes, dimensions, quantities and/or relative positions, now known or later developed—dependent at least in part on the specific context in which the apparatus 20 is to be utilized—so long as the apparatus 20 is capable of substantially carrying out the functionality described herein. Similar to the unit cells 26 of a given cell assembly 52, in at least one embodiment, the cell assemblies 52 of a given assembly layer 54 may be contiguously positioned relative to one another; while in at least one alternate embodiment, one or more of the cell assemblies 52 of a given assembly layer 54 may be non-contiguously positioned. In at least one embodiment, the individual cell assemblies 52 are separately manufactured and subsequently joined together to form a given assembly layer 54. In at least one alternate embodiment, where the unit cells 26 are made of the same constitutive material, the unit cells 26 may be fabricated as a whole through additive or subtractive manufacturing.

Figure 22:
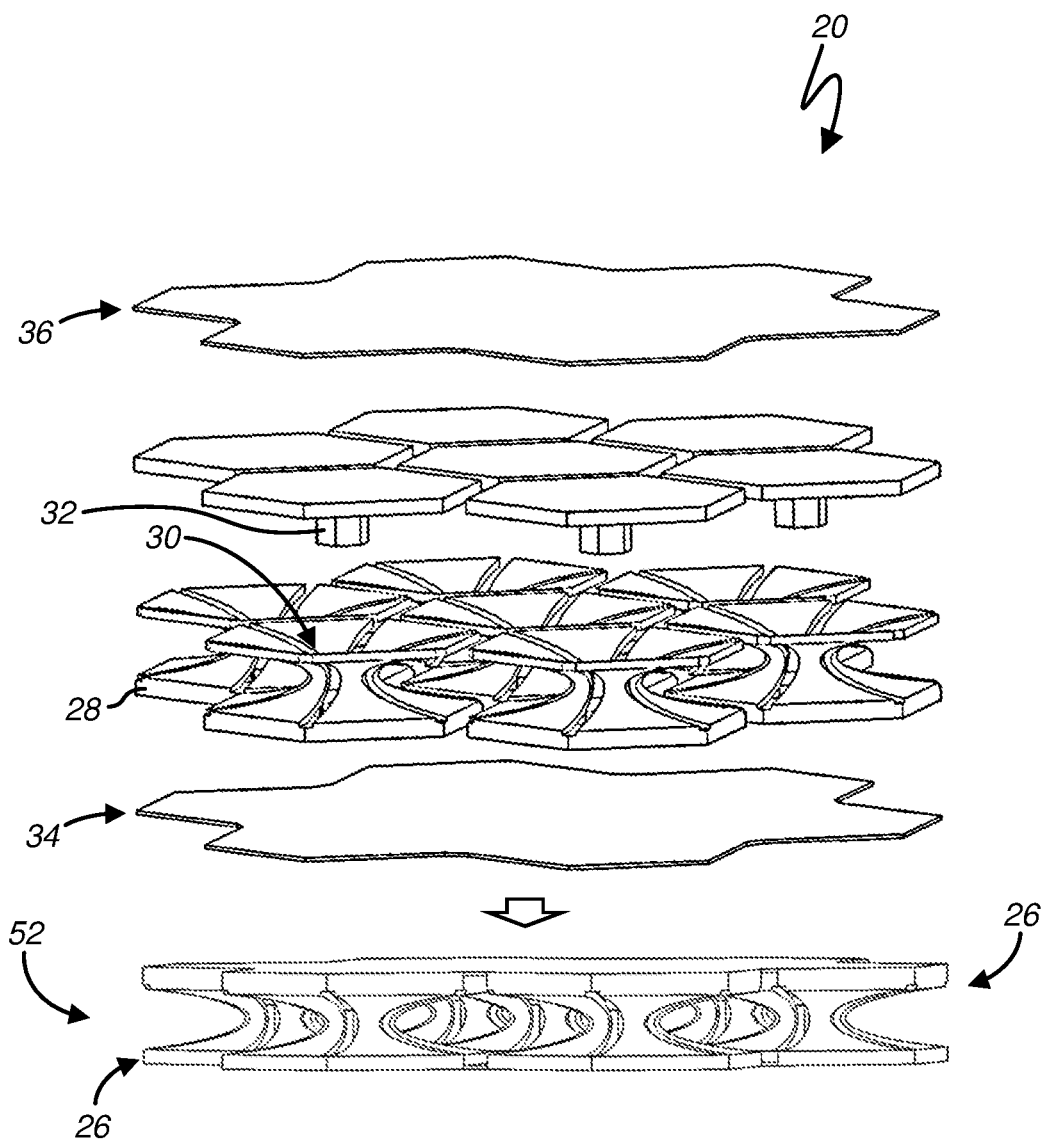
FIG. 22 is an exploded view of a further exemplary cell assembly, in accordance with at least one embodiment.
Figure 23:
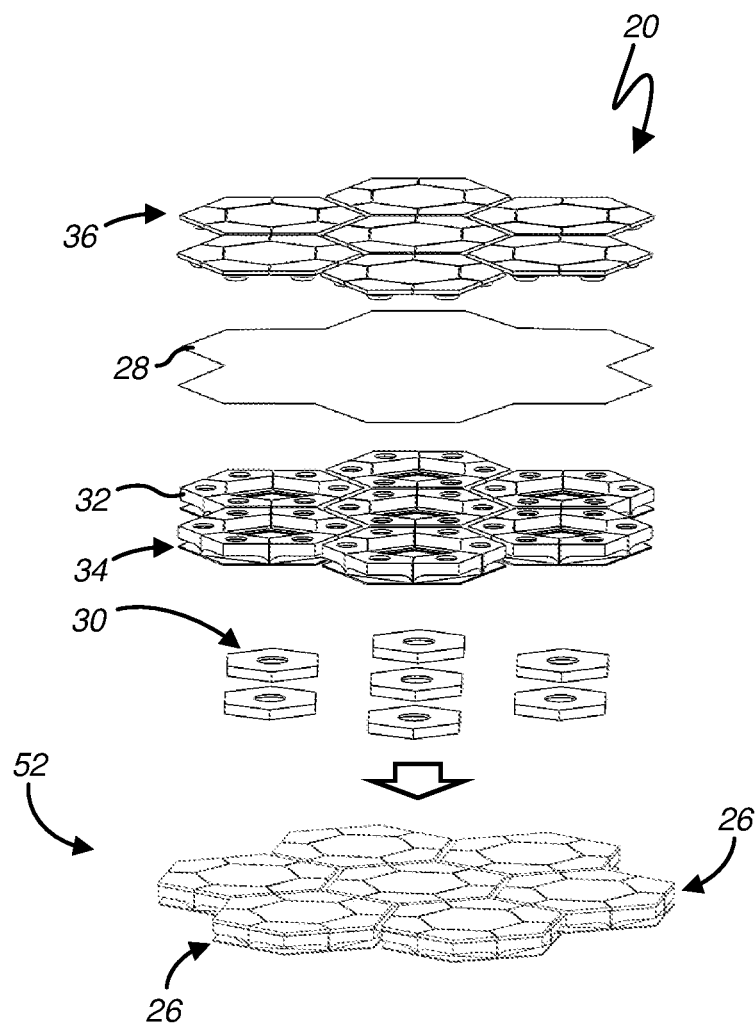
FIG. 23 is an exploded view of a still further exemplary cell assembly, in accordance with at least one embodiment.
Figure 24:
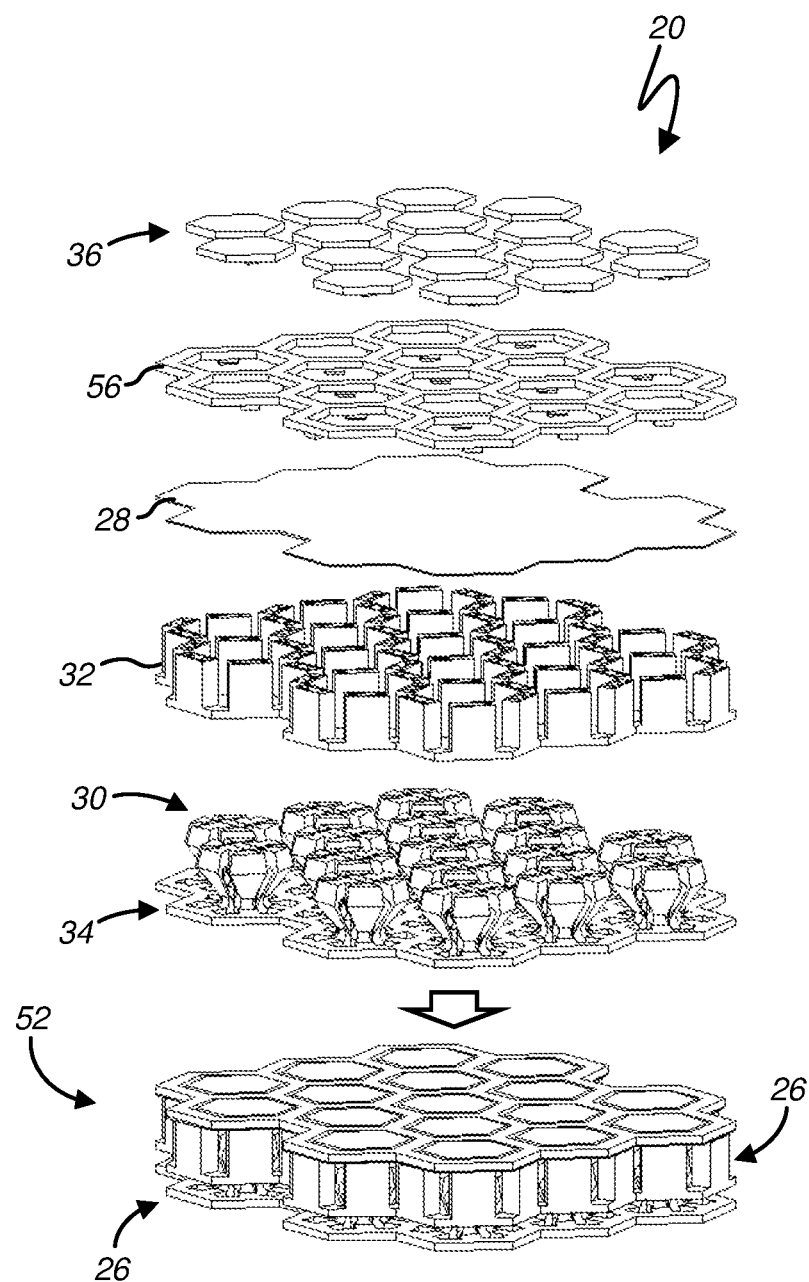
FIG. 24 is an exploded view of a still further exemplary cell assembly, in accordance with at least one embodiment.

In at least one alternate embodiment, as illustrated in FIGS. 22 and 23, the unit cells 26 of the cell assemblies 52 of a given assembly layer 54 provide at least one spring 28 configured as a resilient membrane and positioned for extending across multiple unit cells 26 (and multiple cell assemblies 52, in at least one such embodiment), such that the cell assemblies 52 of the corresponding assembly layer 54 are joined together via the at least one spring 28. In at least one alternate embodiment, as illustrated in FIG. 24, the unit cells 26 of the cell assemblies 52 of a given assembly layer 54 are joined together via a grid of securing elements 56, snap-fit or otherwise.

In at least one embodiment, the apparatus 20 comprises a plurality of assembly layers 54 positioned in a vertically stacked arrangement. In at least one embodiment, the assembly layers 54 are oriented such that all unit cells 26 of a given assembly layer 54 are oriented in substantially the same direction as the unit cells 26 of the other assembly layers 54. In at least one alternate embodiment, the assembly layers 54 are oriented such that the unit cells 26 of at least some of the assembly layers 54 are oriented in a different direction relative to the unit cells 26 of the other assembly layers 54—for example, in a direction substantially transverse to the direction of the unit cells 26 of each immediately adjacent assembly layer 54—dependent at least in part on the specific context in which the apparatus is to be utilized. In at least one embodiment, the first cell plates 34 of a given assembly layer 54 is secured to or otherwise engaged with the second cell plates 36 of the immediately adjacent assembly layer 54, with the first cell plates 34 of the bottom most assembly layer 54 being positioned in direct or indirect abutting contact with the dynamic force source 22, and the second cell plates 36 of the top most assembly layer 54 being positioned in direct or indirect abutting contact with the object 24 to be protected.

It should once again be noted that the size, shape and dimensions of the apparatus 20—including the respective sizes, shapes, dimensions and quantities of each of the unit cells 26, cell assemblies 52 and assembly layers 54—is dependent, at least in part, on the context in which the apparatus 20 is to be utilized. For example, in at least one embodiment, the apparatus 20 may be configured as a cushioning pallet for an object 24, or alternatively as a protective box. Thus, in further embodiments, each of the unit cells 26, cell assemblies 52 and assembly layers 54 may take on any other sizes, shapes, dimensions, positions and/or quantities, now known or later developed, so long as the apparatus 20 is capable of substantially carrying out the functionality described herein.

In at least one embodiment, where the apparatus 20 comprises a plurality of unit cells 26, cell assemblies 52 and/or assembly layers 54, one or more of the unit cells 26, cell assemblies 52 and/or assembly layers 54 may optionally provide different properties or characteristics relative to one or more of the other unit cells 26, cell assemblies 52 and/or assembly layers 54 that govern the dynamic force control, consisting of stiffness, damping, and strength of the apparatus 20.

Figure 25:
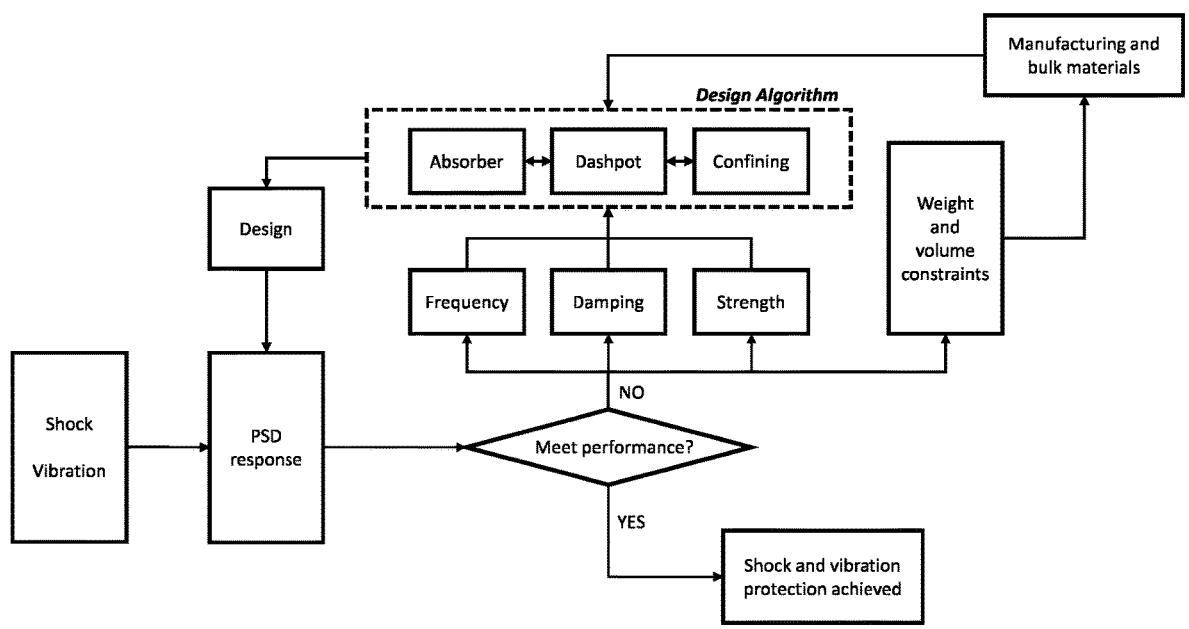
FIG. 25 is a flow diagram illustrating an exemplary method for configuring an exemplary tri-adaptive apparatus, in accordance with at least one embodiment.

In that regard, in at least one embodiment, the mechanical properties of the at least one spring 28, dashpot 30 and restrainer 32 of each unit cell 26 can be chosen to adapt the apparatus 20 to the specific frequency and level of dynamic forces originating from the dynamic force source 22 along with the level of dynamic force admissible on the object 24. FIG. 25 is a flow diagram illustrating an exemplary method for configuring the apparatus 20, in accordance with at least one embodiment. In at least one such embodiment, the method starts from the analysis of a given dynamic force originating from the dynamic force source 22, which is used to evaluate a power spectral density ("PSD") response of the object 24 to be protected. If the PSD response does not achieve a desired protective performance, a range of properties including frequency, damping, and strength are determined to achieve the desired protective performance and are used as an input for the design and configuration of the apparatus 20. In at least one embodiment weight and volume limitations are specified for the protective system set constraints on the choice of the manufacturing methods and of the bulk materials for the components of the apparatus 20, which constitute additional design inputs. The design accounts for the mutual interdependency of the elements within a given unit cell 26 as well as the plurality of unit cells 26 that make up the apparatus 20 to determine the optimal arrangement of the unit cells 26 for given manufacturing constraints and bulk material properties. The metamaterial design is then used to estimate a modified PSD response. If the PSD response meets the desired protective performance requirements, the desired dynamic force protection is achieved. As the amplitude of dynamic force from the dynamic force source 22 increases, the at least one spring 28 provides a variable stiffness, while the at least one dashpot 30 and restrainer 32 provide an increasing damping and strength, respectively. To do so, the at least one spring 28, dashpot 30 and restrainer 32 are designed to modify the extent of their mutual interaction based on the level of dynamic force. The multiplicity of design parameters of the elements in the at least one unit cell 26 allows for an optimal tuning of the dynamic force performance characteristics of the apparatus 20, depending on the dynamic excitation.

Aspects of the present specification may also be described as the following embodiments:

1. A tri-adaptive apparatus configured for functioning as a dynamic force isolation and dampening metamaterial that reduces the transmission of dynamic forces between a dynamic force source and an at least one object, the apparatus comprising: an at least one unit cell comprising: a pair of opposing first and second cell plates; an outer surface of the first cell plate positioned in direct or indirect abutting contact with the dynamic force source; an outer surface of the second cell plate positioned in direct or indirect abutting contact with the at least one object; an at least one nonlinear spring extending between an inner surface of each of the first and second cell plates along a substantially nonlinear path and configured for biasing the unit cell into a neutral state; an at least one restrainer engaged with the inner surface of one of the first or second cell plates and extending a distance substantially perpendicularly therefrom, such that the at least one restrainer is positioned proximal to each of the at least one spring and the inner surface of the other of the first or second cell plates when the unit cell is in the neutral state; and the at least one spring configured for expanding and contracting laterally in the direction of the at least one restrainer upon being subjected to dynamic forces from the dynamic force source, thereby bringing the at least one spring into frictional sliding contact with the at least one restrainer and forming an at least one energy dissipative dashpot therebetween; whereby, the at least one spring, restrainer and dashpot are able to transfer dynamic force energy mutually between one another while deforming mechanically in response to the dynamic forces transmitted by the dynamic force source.

2. The tri-adaptive apparatus according to embodiment 1, wherein the at least one spring is configured as one or more thin-walled plates.

3. The tri-adaptive apparatus according to embodiments 1-2, wherein the at least one unit cell further comprises an at least one spring strut extending between the at least one spring and the inner surface of the second cell plate for forcing a controlled deformation of the at least one spring when one of the first or second cell plates is subjected to dynamic forces from the dynamic force source.

4. The tri-adaptive apparatus according to embodiments 1-3, wherein the at least one restrainer is constructed out of a relatively flexible material.

5. The tri-adaptive apparatus according to embodiments 1-4, wherein the at least one restrainer is engaged with the inner surface of the first or second cell plate via a rotational spring.

6. The tri-adaptive apparatus according to embodiments 1-5, wherein the at least one dashpot is integral with the at least one spring and positioned substantially at a vertex of the at least one spring.

7. The tri-adaptive apparatus according to embodiments 1-6, wherein the at least one unit cell comprises a plurality of restrainers positioned on the inner surface of one or both of the first or second cell plates for frictionally contacting opposing inner and outer surfaces of the at least one dashpot.

8. The tri-adaptive apparatus according to embodiments 1-7, wherein the at least one dashpot comprises a viscoelastic or hysteretic material extending between and interconnecting the at least one spring and restrainer.

9. The tri-adaptive apparatus according to embodiments 1-8, wherein each of the at least one spring, restrainer, first cell plate and second cell plate is constructed out of one or more of metal, metal alloys, polymeric materials, ceramic materials, composite materials, or bio-based materials.

10. The tri-adaptive apparatus according to embodiments 1-9, wherein the at least one unit cell comprises a plurality of springs and restrainers symmetrically arranged radially about an imaginary vertical plane.

11. The tri-adaptive apparatus according to embodiments 1-10, wherein the at least one spring has a substantially uniform thickness.

12. The tri-adaptive apparatus according to embodiments 1-11, wherein the at least one spring has a variable thickness.

13. The tri-adaptive apparatus according to embodiments 1-12, wherein the at least one restrainer is substantially solid in construction.

14. The tri-adaptive apparatus according to embodiments 1-13, wherein the at least one restrainer is substantially hollow in construction.

15. The tri-adaptive apparatus according to embodiments 1-14, wherein the at least one unit cell comprises a plurality of restrainers in frictional sliding contact with one another, thereby forming a further at least one energy dissipative dashpot therebetween.

16. The tri-adaptive apparatus according to embodiments 1-15, wherein one or both of the first and second cell plates is discontinuous in structure.

17. The tri-adaptive apparatus according to embodiments 1-16, wherein: the first cell plate is discontinuous in structure; and the at least one restrainer is positioned and configured for interconnecting the discontinuous first cell plate.

18. The tri-adaptive apparatus according to embodiments 1-17, further comprising a plurality of unit cells positioned in a side-by-side arrangement so as to form an at least one cell assembly.

19. The tri-adaptive apparatus according to embodiments 1-18, wherein the unit cells of the at least one cell assembly are all oriented in substantially the same direction.

20. The tri-adaptive apparatus according to embodiments 1-19, wherein one or more of the unit cells of the at least one cell assembly are oriented in different directions.

21. The tri-adaptive apparatus according to embodiments 1-20, wherein the unit cells of the at least one cell assembly are aligned into a linear strip.

22. The tri-adaptive apparatus according to embodiments 1-21, wherein one or more of the unit cells of the at least one cell assembly are oriented longitudinally with respect to a length of the cell assembly.

23. The tri-adaptive apparatus according to embodiments 1-22, wherein one or more of the unit cells of the at least one cell assembly are oriented transversely with respect to a length of the cell assembly.

24. The tri-adaptive apparatus according to embodiments 1-23, wherein the unit cells of the at least one cell assembly are interconnected via one or both of the respective first or second cell plates of said unit cells.

25. The tri-adaptive apparatus according to embodiments 1-24, wherein one or more of the unit cells of the at least one cell assembly are positioned contiguously relative to one another.

26. The tri-adaptive apparatus according to embodiments 1-25, wherein one or more of the unit cells of the at least one cell assembly are positioned non-contiguously relative to one another.

27. The tri-adaptive apparatus according to embodiments 1-26, further comprising a plurality of cell assemblies positioned in a side-by-side arrangement so as to form an at least one assembly layer.

28. The tri-adaptive apparatus according to embodiments 1-27, wherein one or more of the cell assemblies of the at least one assembly layer are positioned contiguously relative to one another.

29. The tri-adaptive apparatus according to embodiments 1-28, wherein one or more of the cell assemblies of the at least one assembly layer are positioned non-contiguously relative to one another.

30. The tri-adaptive apparatus according to embodiments 1-29, further comprising a plurality of assembly layers positioned in a vertically stacked arrangement.

31. The tri-adaptive apparatus according to embodiments 1-30, wherein the assembly layers are oriented such that all unit cells of each assembly layer are oriented in substantially the same direction.

32. The tri-adaptive apparatus according to embodiments 1-31, wherein the assembly layers are oriented such that the unit cells of at least one of the assembly layers are oriented in a different direction relative to the unit cells of at least one other assembly layer.

33. The tri-adaptive apparatus according to embodiments 1-32, wherein: the first cell plates of the unit cells of each assembly layer are engaged with the second cell plates of the unit cells of the immediately adjacent assembly layer; the first cell plates of the unit cells of a bottom most assembly layer are positioned in direct or indirect abutting contact with the dynamic force source; and the second cell plates of the unit cells of a top most assembly layer are positioned in direct or indirect abutting contact with the at least one object.

34. A tri-adaptive apparatus configured for functioning as a dynamic force isolation and dampening metamaterial that reduces the transmission of dynamic forces between a dynamic force source and an at least one object, the apparatus comprising: a plurality of unit cells positioned in a side-by-side arrangement so as to form an at least one cell assembly, each unit cell comprising: a pair of opposing first and second cell plates; an outer surface of the first cell plate positioned in direct or indirect abutting contact with the dynamic force source; an outer surface of the second cell plate positioned in direct or indirect abutting contact with the at least one object; an at least one nonlinear spring extending between an inner surface of each of the first and second cell plates along a substantially nonlinear path and configured for biasing the unit cell into a neutral state; an at least one restrainer engaged with the inner surface of one of the first or second cell plates and extending a distance substantially perpendicularly therefrom, such that the at least one restrainer is positioned proximal to each of the at least one spring and the inner surface of the other of the first or second cell plates when the unit cell is in the neutral state; and the at least one spring configured for expanding and contracting laterally in the direction of the at least one restrainer upon being subjected to dynamic forces from the dynamic force source, thereby bringing the at least one spring into frictional sliding contact with the at least one restrainer and forming an at least one energy dissipative dashpot therebetween; whereby, the at least one spring, restrainer and dashpot are able to transfer dynamic force energy mutually between one another while deforming mechanically in response to the dynamic forces transmitted by the dynamic force source.

35. A tri-adaptive apparatus configured for functioning as a dynamic force isolation and dampening metamaterial that reduces the transmission of dynamic forces between a dynamic force source and an at least one object, the apparatus comprising: an at least one unit cell comprising: a pair of opposing first and second cell plates; an outer surface of the first cell plate positioned in direct or indirect abutting contact with the dynamic force source; an outer surface of the second cell plate positioned in direct or indirect abutting contact with the at least one object; a pair of spaced apart first restrainers engaged with an inner surface of the first cell plate and extending a distance substantially perpendicularly therefrom so as to be positioned proximal to an inner surface of the second cell plate when the unit cell is in a neutral state; a pair of spaced apart second restrainers engaged with the inner surface of the second cell plate and extending a distance substantially perpendicularly therefrom so as to be positioned proximal to the inner surface of the first cell plate when the unit cell is in a neutral state; an at least one substantially horizontally-oriented spring engaged with and extending between the first restrainers, the at least one spring configured for biasing the unit cell into a neutral state; the at least one spring further configured for expanding and contracting laterally in the direction of the first and second restrainers upon being subjected to dynamic forces from the dynamic force source, thereby bringing the first restrainers into frictional sliding contact with the second restrainers and forming an at least one energy dissipative dashpot therebetween; whereby, the at least one spring, at least one dashpot and restrainers are able to transfer dynamic force energy mutually between one another while deforming mechanically in response to the dynamic forces transmitted by the dynamic force source.

36. The tri-adaptive apparatus according to embodiment 35, wherein the at least one spring is constructed out of a resilient material.

37. The tri-adaptive apparatus according to embodiments 35-36, wherein the at least one spring is a substantially planar membrane.

38. The tri-adaptive apparatus according to embodiments 35-37, wherein the at least one spring is configured as an elongated band or string.

39. The tri-adaptive apparatus according to embodiments 35-38, wherein the second restrainers are a circumferential sidewall of the second cell plate.

40. The tri-adaptive apparatus according to embodiments 35-39, wherein the at least one unit cell further comprises an at least one securing element configured for joining each of the at least one spring, restrainer, first cell plate and second cell plate together.

41. The tri-adaptive apparatus according to embodiments 35-40, wherein the at least one securing element provides a snap-fit engagement.

42. The tri-adaptive apparatus according to embodiments 35-41, further comprising a plurality of unit cells positioned in a side-by-side arrangement so as to form an at least one cell assembly.

43. The tri-adaptive apparatus according to embodiments 35-42, wherein the unit cells of the at least one cell assembly are aligned into a linear strip.

44. The tri-adaptive apparatus according to embodiments 35-43, wherein the unit cells of the at least one cell assembly are interconnected via one or both of the respective first or second cell plates of said unit cells.

45. The tri-adaptive apparatus according to embodiments 35-44, wherein one or more of the unit cells of the at least one cell assembly are positioned contiguously relative to one another.

46. The tri-adaptive apparatus according to embodiments 35-45, wherein one or more of the unit cells of the at least one cell assembly are positioned non-contiguously relative to one another.

47. The tri-adaptive apparatus according to embodiments 35-46, further comprising a plurality of cell assemblies positioned in a side-by-side arrangement so as to form an at least one assembly layer.

48. The tri-adaptive apparatus according to embodiments 35-47, wherein one or more of the cell assemblies of the at least one assembly layer are positioned contiguously relative to one another.

49. The tri-adaptive apparatus according to embodiments 35-48, wherein one or more of the cell assemblies of the at least one assembly layer are positioned non-contiguously relative to one another.

50. The tri-adaptive apparatus according to embodiments 35-49, wherein the unit cells of the at least one cell assembly of the at least one assembly layer are interconnected via the at least one spring of said unit cells.
51. The tri-adaptive apparatus according to embodiments 35-50, wherein the unit cells of the at least one cell assembly of the at least one assembly layer are interconnected via an at least one securing element.
52. The tri-adaptive apparatus according to embodiments 35-51, further comprising a plurality of assembly layers positioned in a vertically stacked arrangement.
53. The tri-adaptive apparatus according to embodiments 35-52, wherein the assembly layers are oriented such that all unit cells of each assembly layer are oriented in substantially the same direction.
54. The tri-adaptive apparatus according to embodiments 35-53, wherein the assembly layers are oriented such that the unit cells of at least one of the assembly layers are oriented in a different direction relative to the unit cells of at least one other assembly layer.
55. The tri-adaptive apparatus according to embodiments 35-54, wherein: the first cell plates of the unit cells of each assembly layer are engaged with the second cell plates of the unit cells of the immediately adjacent assembly layer; the first cell plates of the unit cells of a bottom most assembly layer are positioned in direct or indirect abutting contact with the dynamic force source; and the second cell plates of the unit cells of a top most assembly layer are positioned in direct or indirect abutting contact with the at least one object.
56. The tri-adaptive apparatus according to embodiments 35-55, wherein the at least one unit cell comprises a plurality of springs and restrainers symmetrically arranged radially about an imaginary vertical plane.
57. A tri-adaptive apparatus configured for functioning as a dynamic force isolation and dampening metamaterial that reduces the transmission of dynamic forces between a dynamic force source and an at least one object, the apparatus comprising: a plurality of unit cells positioned in a side-by-side arrangement so as to form an at least one cell assembly, each unit cell comprising: a pair of opposing first and second cell plates; an outer surface of the first cell plate positioned in direct or indirect abutting contact with the dynamic force source; an outer surface of the second cell plate positioned in direct or indirect abutting contact with the at least one object; a pair of spaced apart restrainers engaged with an inner surface of the first cell plate and extending a distance substantially perpendicularly therefrom so as to be positioned proximal to an inner surface of the second cell plate when the unit cell is in a neutral state; an at least one substantially horizontally-oriented spring engaged with and extending between the restrainers, the at least one spring configured for biasing the unit cell into a neutral state; the at least one spring further configured for expanding and contracting laterally in the direction of the restrainers upon being subjected to dynamic forces from the dynamic force source, thereby bringing the at least one spring into frictional sliding contact with the restrainers and forming an at least one energy dissipative dashpot therebetween; whereby, the at least one spring, restrainer and dashpot are able to transfer dynamic force energy mutually between one another while deforming mechanically in response to the dynamic forces transmitted by the dynamic force source.

In closing, regarding the exemplary embodiments of the present invention as shown and described herein, it will be appreciated that a tri-adaptive apparatus is disclosed and configured for providing shock and vibration protection. Because the principles of the invention may be practiced in a number of configurations beyond those shown and described, it is to be understood that the invention is not in any way limited by the exemplary embodiments, but is generally directed to a tri-adaptive apparatus and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the terms "about" and "approximately." As used herein, the terms "about" and "approximately" mean that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art, or at least encompassing a range of plus or minus ten percent above and below the value of the stated characteristic, item, quantity, parameter, property, or term.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc. —for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that any methods disclosed herein, along with the order in which the respective elements of any such method are performed, are purely exemplary. Depending on the implementation, they may be performed in any order or in parallel, unless indicated otherwise in the present disclosure.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A tri-adaptive apparatus configured for functioning as a dynamic force isolation and dampening metamaterial that reduces the transmission of dynamic forces between a dynamic force source and an at least one object, the apparatus comprising:
    an at least one unit cell comprising:
        a pair of opposing first and second cell plates;
        an outer surface of the first cell plate positioned in direct or indirect abutting contact with the dynamic force source;
        an outer surface of the second cell plate positioned in direct or indirect abutting contact with the at least one object;
        an at least one nonlinear spring extending between an inner surface of each of the first and second cell plates along a substantially nonlinear path and configured for biasing the unit cell into a neutral state;
        an at least one flexible restrainer engaged with the inner surface of one of the first or second cell plates and extending a distance perpendicularly therefrom, such that the at least one restrainer is positioned proximal to, but spaced apart from, each of the at least one spring and the inner surface of the other of the first or second cell plates when the unit cell is in the neutral state; and
        the at least one spring configured for expanding and contracting laterally in the direction of the at least one restrainer upon being subjected to dynamic forces from the dynamic force source, thereby bringing the at least one spring into frictional sliding contact with the at least one restrainer and forming an at least one energy dissipative dashpot therebetween;
    whereby, the at least one spring, restrainer and dashpot are able to transfer dynamic force energy mutually between one another while deforming mechanically in response to the dynamic forces transmitted by the dynamic force source.

2. The tri-adaptive apparatus of claim 1, wherein the at least one spring is configured as one or more thin-walled plates.

3. The tri-adaptive apparatus of claim 1, wherein the at least one unit cell further comprises an at least one spring strut extending between the at least one spring and the inner surface of the second cell plate for forcing a controlled deformation of the at least one spring when one of the first or second cell plates is subjected to dynamic forces from the dynamic force source.

4. The tri-adaptive apparatus of claim 1, wherein the at least one dashpot is integral with the at least one spring and positioned substantially at a vertex of the at least one spring.

5. The tri-adaptive apparatus of claim 4, wherein the at least one unit cell comprises a plurality of restrainers positioned on the inner surface of one or both of the first or second cell plates for frictionally contacting opposing inner and outer surfaces of the at least one dashpot.

6. The tri-adaptive apparatus of claim 1, wherein the at least one unit cell comprises a plurality of springs and restrainers symmetrically arranged radially about an imaginary vertical plane.

7. The tri-adaptive apparatus of claim 1, wherein the at least one unit cell comprises a plurality of restrainers in frictional sliding contact with one another, thereby forming a further at least one energy dissipative dashpot therebetween.

8. The tri-adaptive apparatus of claim 1, wherein:
    the first cell plate is discontinuous in structure; and
    the at least one restrainer is positioned and configured for interconnecting the discontinuous first cell plate.

9. The tri-adaptive apparatus of claim 1, further comprising a plurality of unit cells positioned in a side-by-side arrangement so as to form an at least one cell assembly.

10. The tri-adaptive apparatus of claim 9, wherein one or more of the unit cells of the at least one cell assembly are positioned non-contiguously relative to one another.

11. The tri-adaptive apparatus of 9, further comprising a plurality of cell assemblies positioned in a side-by-side arrangement so as to form an at least one assembly layer.

12. The tri-adaptive apparatus of 11, further comprising a plurality of assembly layers positioned in a vertically stacked arrangement.

13. A tri-adaptive apparatus configured for functioning as a dynamic force isolation and dampening metamaterial that reduces the transmission of dynamic forces between a dynamic force source and an at least one object, the apparatus comprising:
    a plurality of unit cells positioned in a side-by-side arrangement so as to form an at least one cell assembly, each unit cell comprising:
        a pair of opposing first and second cell plates;
        an outer surface of the first cell plate positioned in direct or indirect abutting contact with the dynamic force source;
        an outer surface of the second cell plate positioned in direct or indirect abutting contact with the at least one object;
        an at least one nonlinear spring extending between an inner surface of each of the first and second cell plates along a substantially nonlinear path and configured for biasing the unit cell into a neutral state;
        an at least one flexible restrainer engaged with the inner surface of one of the first or second cell plates and extending a distance perpendicularly therefrom, such that the at least one restrainer is positioned proximal to, but spaced apart from, each of the at least one spring and the inner surface of the other of the first or second cell plates when the unit cell is in the neutral state; and
        the at least one spring configured for expanding and contracting laterally in the direction of the at least one restrainer upon being subjected to dynamic forces from the dynamic force source, thereby bringing the at least one spring into frictional sliding contact with the at least one restrainer and forming an at least one energy dissipative dashpot therebetween;
    whereby, the at least one spring, restrainer and dashpot are able to transfer dynamic force energy mutually between one another while deforming mechanically in response to the dynamic forces transmitted by the dynamic force source.

* * * * *